US010311345B2

(12) United States Patent
Imai et al.

(10) Patent No.: US 10,311,345 B2
(45) Date of Patent: Jun. 4, 2019

(54) IMAGE-FORMING APPARATUS CONFIGURED TO CONTROL ROTATION OF DEVELOPING ROLLER TO PREVENT TONER LEAKAGE

(71) Applicant: Brother Kogyo Kabushiki Kaisha, Nagoya-shi, Aichi-ken (JP)

(72) Inventors: Masashi Imai, Kasugai (JP); Daisuke Maeta, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 16/026,147

(22) Filed: Jul. 3, 2018

(65) Prior Publication Data
US 2019/0034770 A1  Jan. 31, 2019

(30) Foreign Application Priority Data
Jul. 31, 2017 (JP) .................................. 2017-148629

(51) Int. Cl.
G06K 15/00 (2006.01)
G06K 15/12 (2006.01)
(52) U.S. Cl.
CPC ....... *G06K 15/4075* (2013.01); *G06K 15/129* (2013.01)
(58) Field of Classification Search
USPC ...................................................... 358/1.14
See application file for complete search history.

(56) References Cited

U.S. PATENT DOCUMENTS

| 7,539,432 | B2 | 5/2009 | Dan | |
| 2008/0031649 | A1* | 2/2008 | Dan | G03G 15/168 399/71 |
| 2013/0051849 | A1 | 2/2013 | Itabashi et al. | |
| 2013/0168921 | A1 | 7/2013 | Suzuki et al. | |
| 2013/0287451 | A1* | 10/2013 | Yamamoto | G03G 15/0806 399/281 |
| 2014/0178087 | A1* | 6/2014 | Suzuki | G03G 15/011 399/50 |
| 2016/0231665 | A1* | 8/2016 | Shinkawa | G03G 15/065 |

FOREIGN PATENT DOCUMENTS

| JP | 2005-017668 A | 1/2005 |
| JP | 2008-039905 A | 2/2008 |
| JP | 2013-054058 A | 3/2013 |
| JP | 2013-137378 A | 7/2013 |

* cited by examiner

Primary Examiner — Neil R McLean
Assistant Examiner — Darryl V Dottin
(74) Attorney, Agent, or Firm — Banner & Witcoff, Ltd.

(57) ABSTRACT

An image-forming apparatus includes a photosensitive drum, a developing roller, a collecting roller, a belt, a cleaner, and a controller. In response to receiving a signal, the controller performs a process staring with a first process and ending with a second process. The controller rotates the developing roller at a contact position at a first speed in the first process. The controller causes the collecting roller to move residual toner to the belt to allow the cleaner to clean the belt while the developing roller is separated from the photosensitive drum in the second process. The process further includes: (a) causing the developing roller to halt rotating while maintaining the developing roller at the contact position; and (b) causing the developing roller halted in the (a) causing to start rotating at a second speed lower than the first speed while maintaining the developing roller at the contact position.

20 Claims, 16 Drawing Sheets

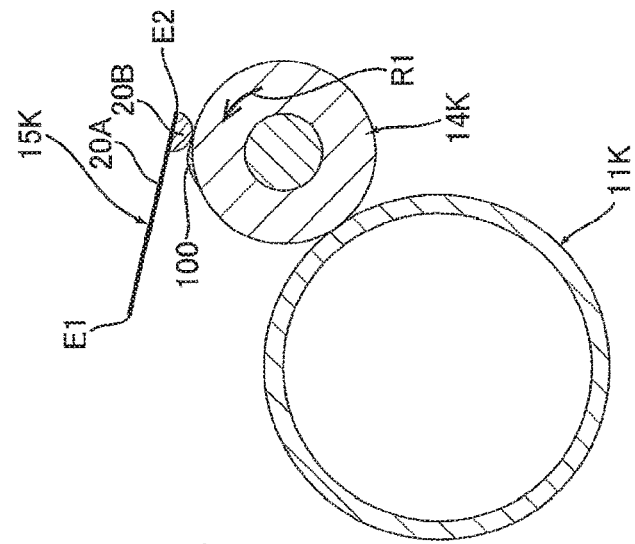
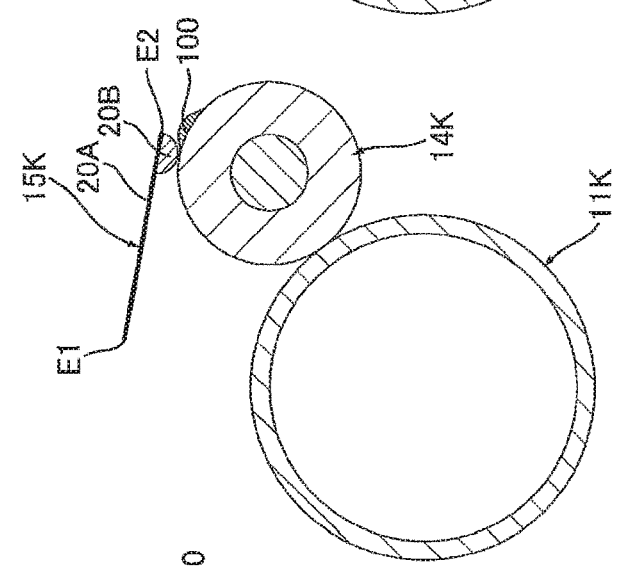
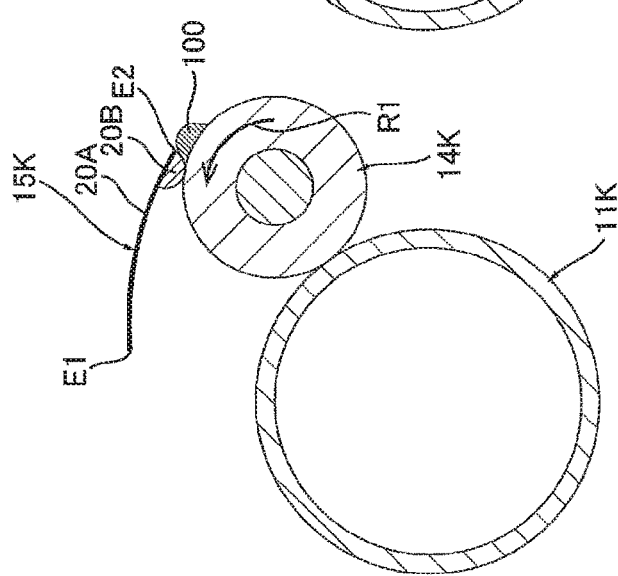

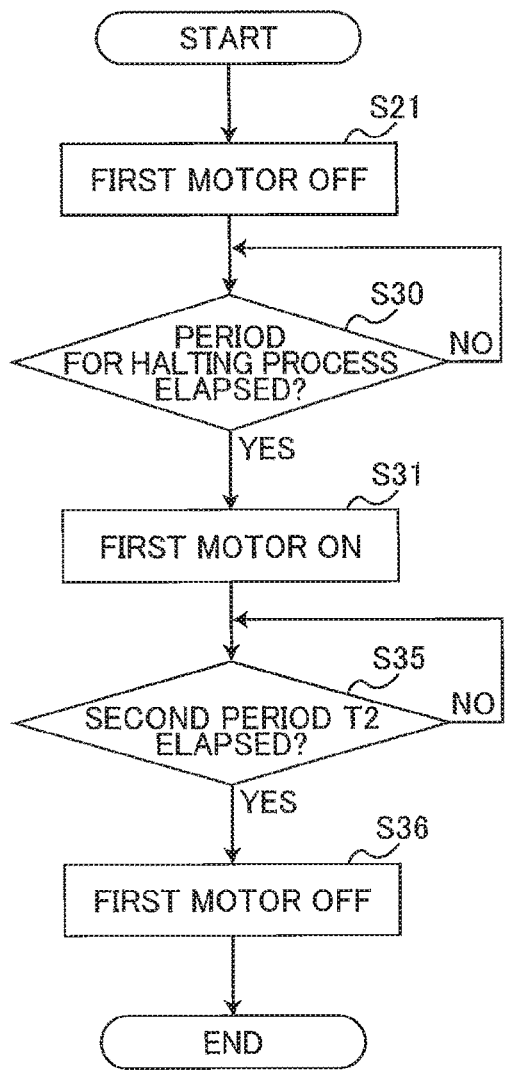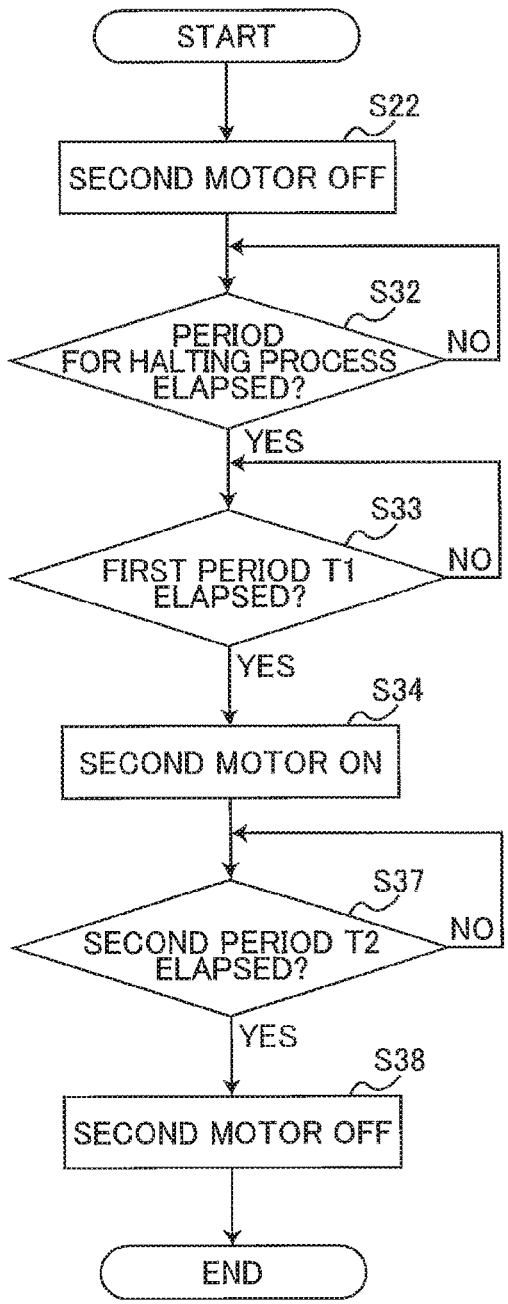

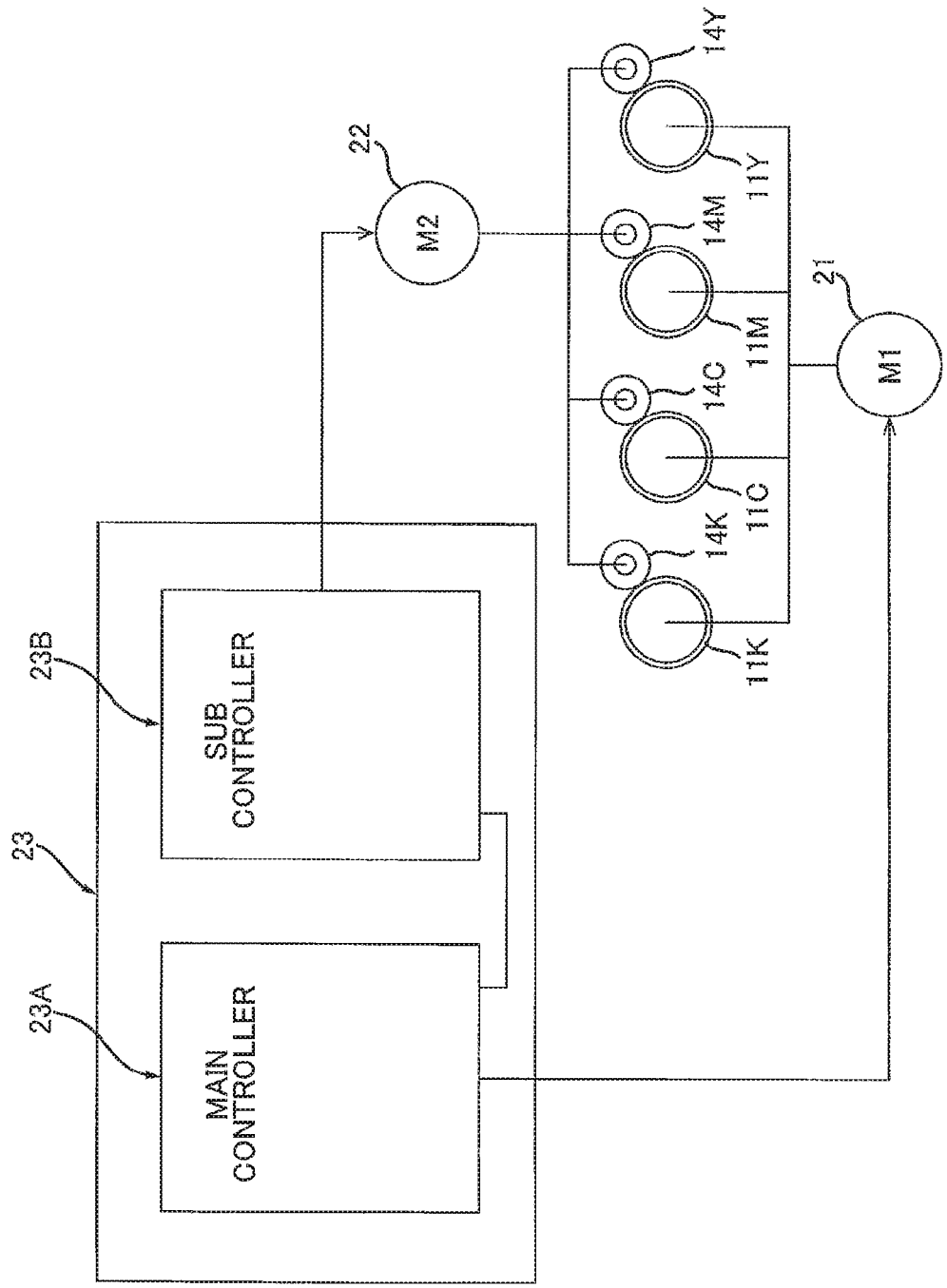

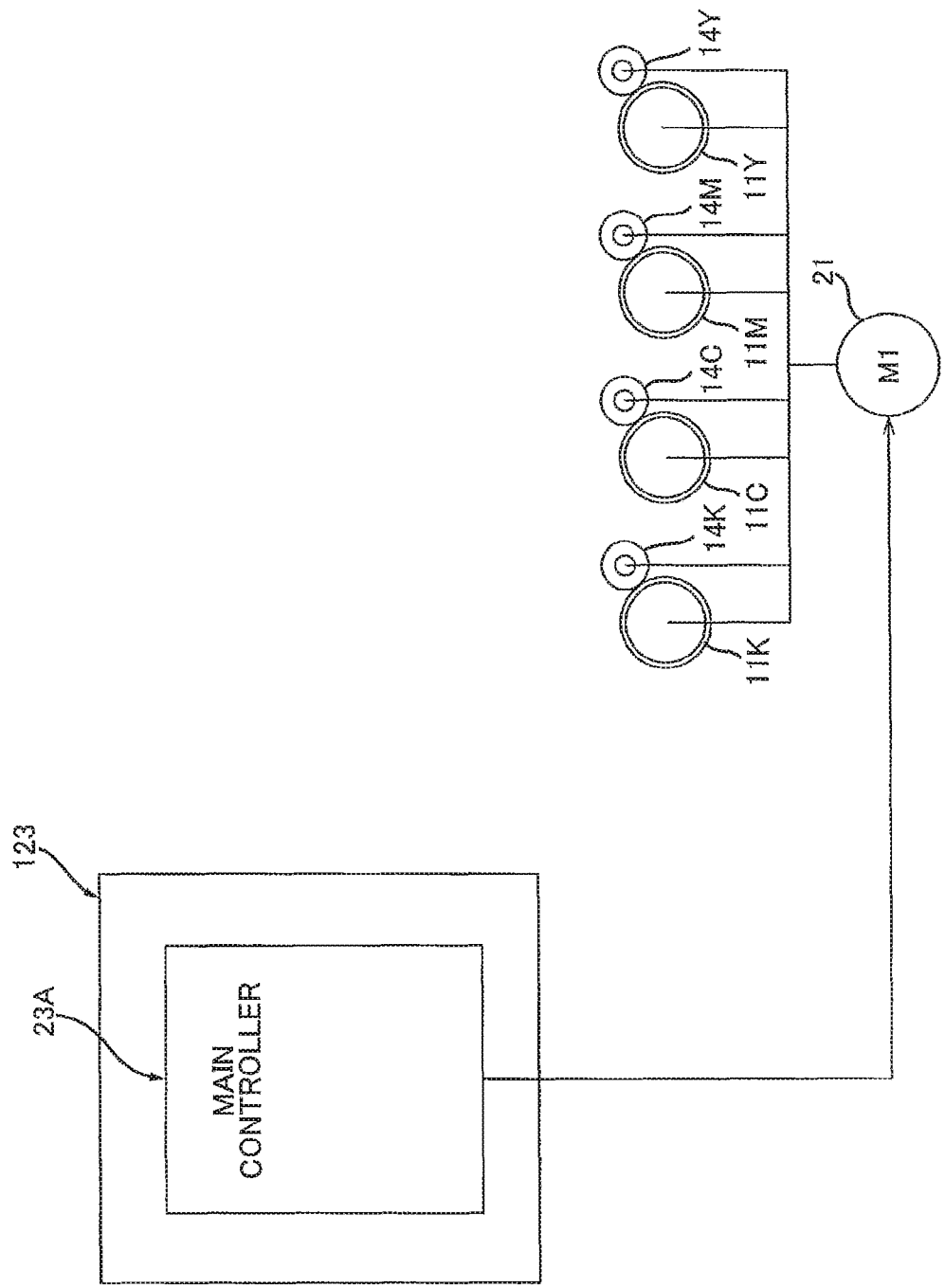

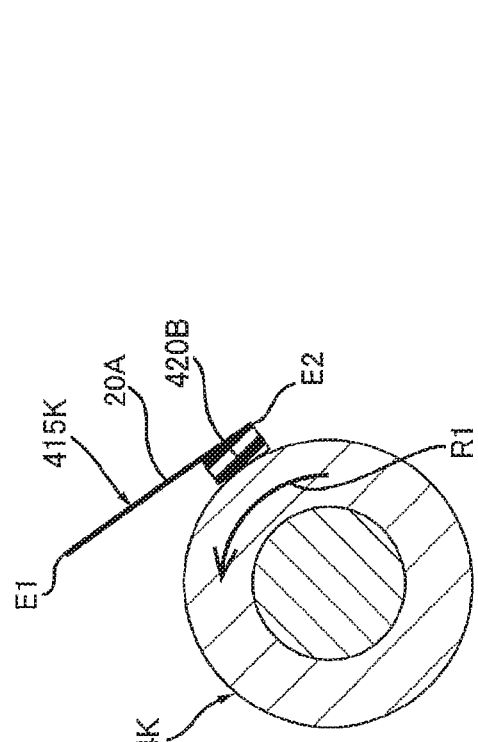

IMAGE-FORMING APPARATUS CONFIGURED TO CONTROL ROTATION OF DEVELOPING ROLLER TO PREVENT TONER LEAKAGE

CROSS REFERENCE TO RELATED APPLICATION

This application claims priority from Japanese Patent Application No. 2017-148629 filed Jul. 31, 2017. The entire content of the priority application is incorporated herein by reference.

TECHNICAL FIELD

The present disclosure relates to an image-forming apparatus.

BACKGROUND

Japanese Patent Application Publication No. 2008-039905 discloses a conventional image-forming apparatus that includes a photosensitive drum, a developing roller, a collecting roller, a belt, and a cleaning member. The developing roller is configured to supply toner to the photosensitive drum. The collecting roller is configured to collect residual toner on the photosensitive drum. The belt is in contact with the photosensitive drum. The cleaning member is configured to collect the toner on the belt to clean the belt.

In this image-forming apparatus, the residual toner collected by the collecting roller is configured to move from the collecting roller to the belt through the photosensitive drum. The cleaning member is then configured to collect the residual toner moved onto the belt.

SUMMARY

In the above-described image-forming apparatus, toner deposited on a peripheral surface of the developing roller may accumulate to form a lump of toner thereon. Such lump of toner may cause toner leakage from around the developing roller.

For example, assume that the image-forming apparatus is further provided with a thickness regulating blade for regulating a thickness of the toner carried on the developing roller. In this case, toner may accumulate between the thickness regulating blade and the developing roller to become harder therebetween. As the lump of toner grows larger, a gap is likely to be formed between the thickness regulating blade and the developing roller. As a result, toner leakage may occur through the gap between the thickness regulating blade and the developing roller.

In view of the foregoing, it is an object of the present disclosure to provide an image-forming apparatus capable of suppressing toner leakage around a developing roller.

In order to attain the above and other objects, the present disclosure provides an image-forming apparatus including: a photosensitive drum; a developing roller rotatable to supply toner to the photosensitive drum; a collecting roller; a belt in contact with the photosensitive drum; a cleaner in contact with the belt; and a controller. The developing roller is movable between a contact position in contact with the photosensitive drum and a separation position spaced away from the photosensitive drum. The collecting roller is rotatable to collect residual toner on the photosensitive drum. The cleaner is capable of collecting the residual toner on the belt. The controller is configured to perform a process in response to receiving a prescribed signal. The process starts with a first process and ends with a second process. In the first process, the controller causes the developing roller to rotate at a first speed in a first direction while maintaining the developing roller at the contact position, the first process being executed in response to receiving the prescribed signal. In the second process, the controller causes the collecting roller to move the residual toner thereon to the photosensitive drum and then to the belt to allow the cleaner to collect the residual toner on the belt while maintaining the developing roller at the separation position. The process further includes: (a) causing the developing roller to halt rotating while maintaining the developing roller at the contact position; and (b) causing the developing roller having stopped rotating in the (a) causing to start rotating at a second speed lower than the first speed in the first direction while maintaining the developing roller at the contact position. The (a) causing is executed after the first process, and the (b) causing is executed after the (a) causing and prior to the second process.

BRIEF DESCRIPTION OF THE DRAWINGS

In the drawings:

FIG. 5A is an explanatory view illustrating a state of toner accumulated between a thickness regulating blade and its corresponding developing roller during a normal-speed rotation process executed in the process of FIG. 3;

FIG. 5B is an explanatory view illustrating a state of toner accumulated between the thickness regulating blade and its corresponding developing roller during a halting process executed in the process of FIG. 3;

FIG. 6 is an explanatory view illustrating a state of toner accumulated between the thickness regulating blade and its corresponding developing roller during a low-speed rotation process executed in the process of FIG. 3;

FIG. 7A is a flowchart illustrating steps executed by a main controller of the controller during the halt process and the lower-speed rotation process executed in the process of FIG. 3;

FIG. 7B is a flowchart illustrating steps executed by a sub controller of the controller during the halt process and the lower-speed rotation process executed in the process of FIG. 3;

FIG. 14 is a block diagram illustrating configurations of a controller, a first motor and a second motor according to a modification to the first embodiment;

FIG. 15 is a block diagram illustrating configurations of a controller and a first motor according to another modification to the first embodiment; and FIGS. 16A through 16G depict various modifications to a thickness regulation blade of the first embodiment.

DETAILED DESCRIPTION

First Embodiment

An image-forming apparatus 1 according to a first embodiment of the present disclosure will be described with reference to FIGS. 1 through 8.

Figure 1:
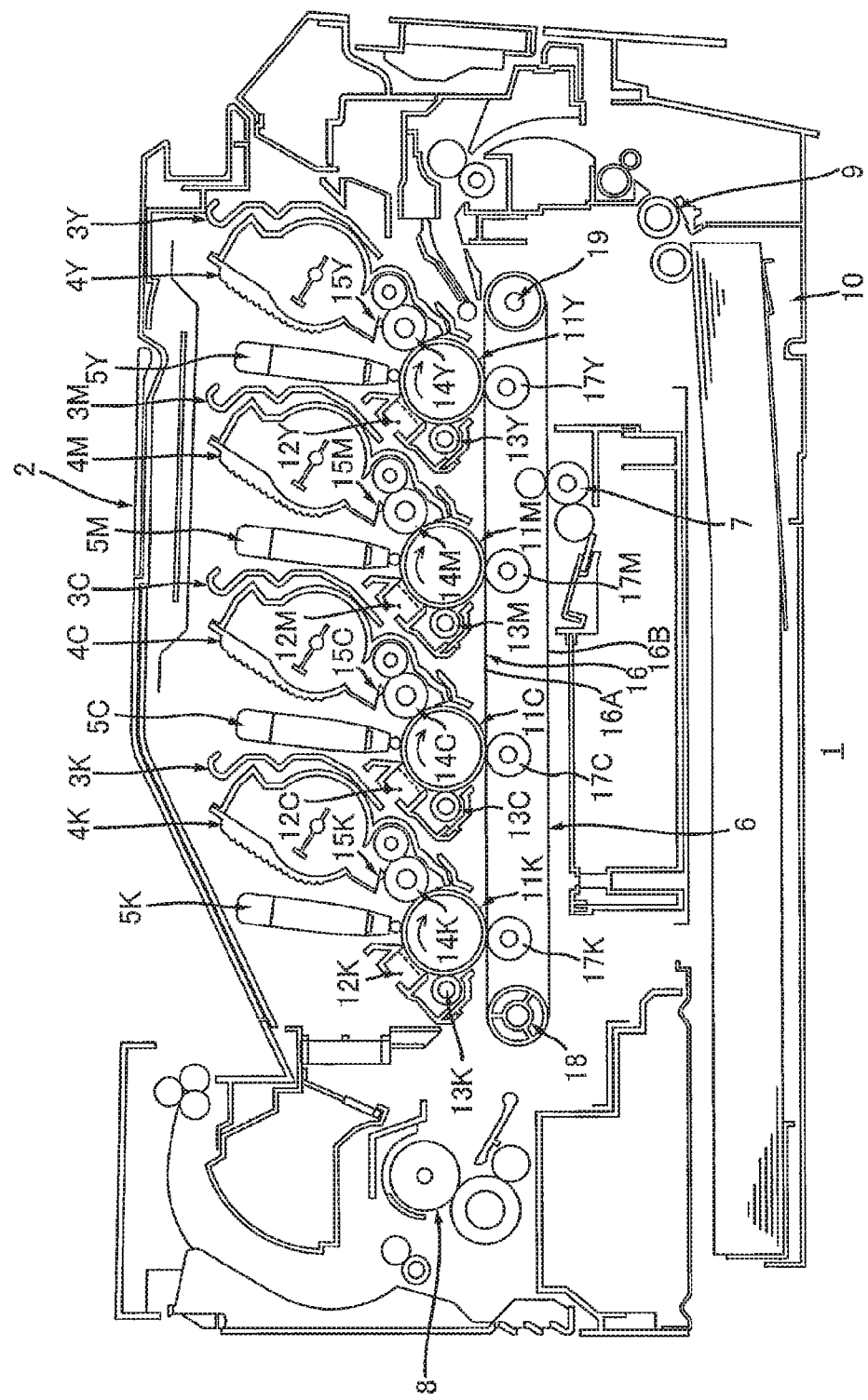
FIG. 1 is a central cross-sectional view schematically illustrating an image-forming apparatus according to a first embodiment, wherein each developing roller is at its contact position.

As illustrated in FIG. 1, an image-forming apparatus 1 includes a main casing 2, a plurality of (four) drum cartridges 3Y, 3M, 3C, and 3K, a plurality of (four) developing cartridges 4Y, 4M, 4C, and 4K, a plurality of (four) exposure devices 5Y, 5M, 5C, and 5K, a belt unit 6, a cleaner 7, a fixing device 8, a sheet feeder 9, and a sheet tray 10.

1. Overall Structure of the Image-Forming Apparatus 1

<Main Casing 2>

The main casing 2 constitutes an exterior of the image-forming apparatus 1. The main casing 2 accommodates therein the drum cartridges 3Y, 3M, 3C and 3K, the developing cartridges 4Y, 4M, 4C and 4K, the exposure devices 5Y, 5M, 5C and 5K, the belt unit 6, the cleaner 7, the fixing device 8, the sheet feeder 9, and the sheet tray 10.

<Drum Cartridges 3Y, 3M, 3C, and 3K>

Each of the four drum cartridges 3Y, 3M, 3C and 3K is mountable in and removable from the main casing 2. When mounted in the main casing 2, the four drum cartridges 3Y, 3M, 3C and 3K are aligned with one another in a predetermined direction (hereinafter, to be referred to as "alignment direction").

Since the drum cartridges 3Y, 3M, 3C, and 3K have the same structures as one another, the drum cartridge 3K will be described in detail, while descriptions on the drum cartridges 3Y, 3M, and 3C will be omitted.

The drum cartridge 3K includes a photosensitive drum 11K, a charger 12K, and a collecting roller 13K. In other words, the image-forming apparatus 1 includes the photosensitive drum 11K and the collecting roller 13K.

The photosensitive drum 11K is rotatable about an axis extending in an axial direction crossing the alignment direction. In the present embodiment, the axial direction and the alignment direction are orthogonal to each other. The photosensitive drum 11K is configured to rotate in a clockwise direction in FIG. 1 (indicated by an arrow in FIG. 1).

The charger 12K is arranged to face a peripheral surface of the photosensitive drum 11K to charge the peripheral surface of the photosensitive drum 11K. In a state where the drum cartridge 3K is mounted in the main casing 2, the charger 12K is positioned between the collecting roller 13K and the exposure device 5K in a rotation direction of the photosensitive drum 11K (i.e., the clockwise direction in FIG. 1). Specifically, the charger 12K is positioned upstream of the collecting roller 13K, and downstream of the exposure device 5K in the rotation direction of the photosensitive drum 11K. In the present embodiment, the charger 12K is a scorotron-type charger.

The collecting roller 13K is configured to collect residual toner on the peripheral surface of the photosensitive drum 11K. The collecting roller 13K is in contact with the peripheral surface of the photosensitive drum 11K. In the state where the drum cartridge 3K is mounted in the main casing 2, the collecting roller 13K is positioned between a transfer roller 17K (described later) of the belt unit 6 and the charger 12K in the rotation direction of the photosensitive drum 11K.

<Developing Cartridges 4Y, 4M, 4C, and 4K>

Since the developing cartridges 4Y, 4M, 4C, and 4K have the same structures as one another, the developing cartridge 4K will be described in detail, while descriptions on the developing cartridges 4Y, 4M, and 4C will be omitted.

The developing cartridge 4K is detachably attachable to the drum cartridge 3K. The developing cartridge 4K attached to the drum cartridge 3K is mountable in and removable from the main casing 2. The developing cartridge 4K stores toner therein. The developing cartridge 4K includes a developing roller 14K and a thickness regulating blade 15K. In other words, the image-forming apparatus 1 includes the developing roller 14K.

The developing roller 14K is configured to supply toner to the photosensitive drum 11K. In the present embodiment, the developing roller 14K is a rubber roller having electrical conductivity. The developing roller 14K has a columnar shape and extends in the axis direction. Specifically, in the present embodiment, the developing roller 14K has a diameter of 13 mm. In a state where the drum cartridge 3K and the developing cartridge 4K are mounted in the main casing 2, the developing roller 14K is positioned between the exposure device 5K and the transfer roller 17K in the rotation direction of the photosensitive drum 11K.

Figure 8:
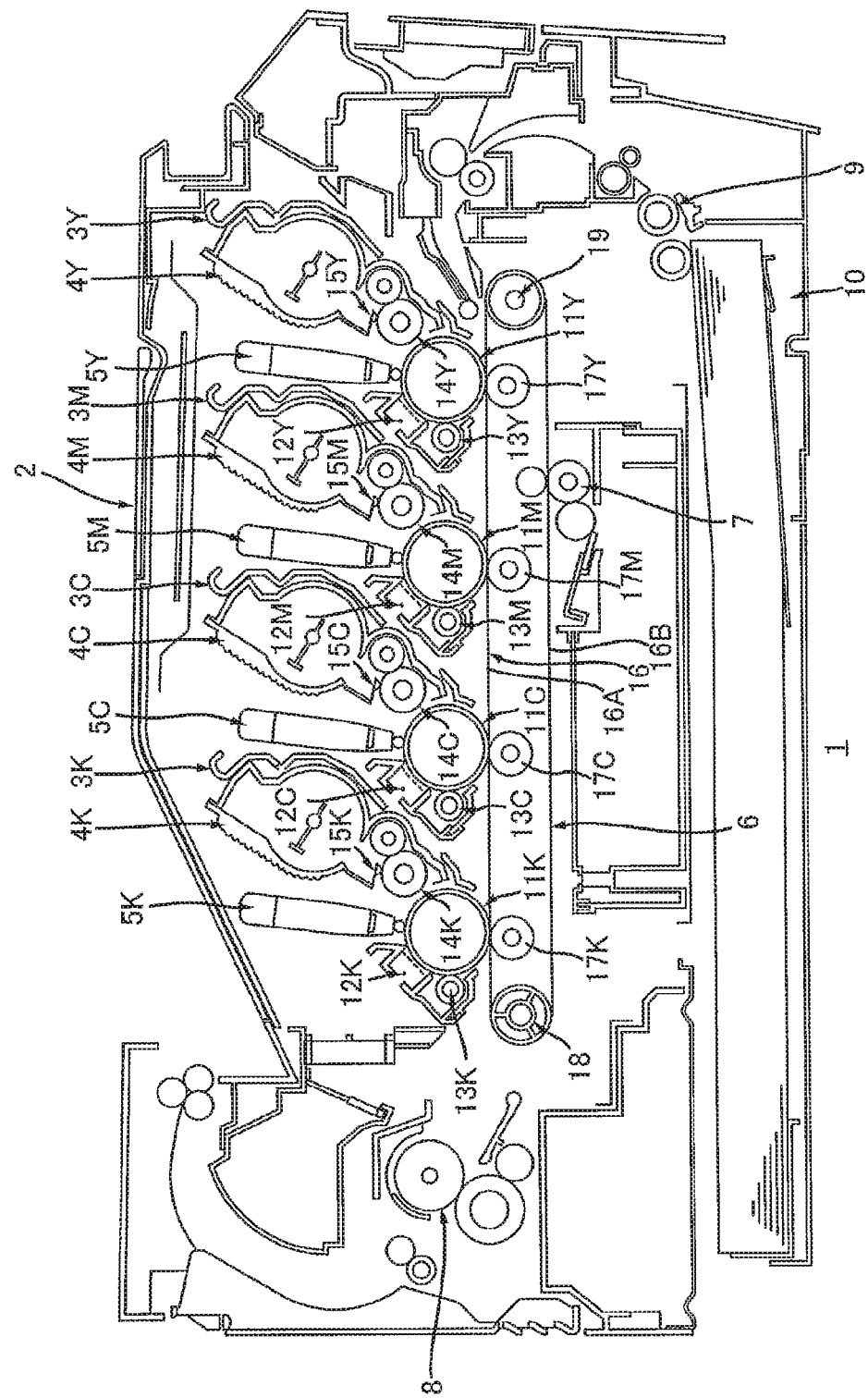
FIG. 8 is a central cross-sectional view schematically illustrating the image-forming apparatus according to the first embodiment, wherein each developing roller is at its separation position.

The developing roller 14K is movable between a contact position (depicted in FIG. 1) and a separation position (depicted in FIG. 8). At the contact position, the developing roller 14K is in contact with the photosensitive drum 11K to allow toner supply to the photosensitive drum 11K. At the separation position, the developing roller 14K is separated from the photosensitive drum 11K so that the developing roller 14K cannot supply toner to the photosensitive drum 11K. In order to allow the developing roller 14K to move between the contact position and the separation position, a well-known separation member can be applied. For example, a separation member described in Japanese Patent Application Publication No. 2013-054058 may be employed.

The thickness regulating blade 15K is configured to regulate a thickness of the toner carried on a peripheral surface of the developing roller 14K to a constant thickness. The thickness regulating blade 15K has a plate shape and extends in the axis direction. The thickness regulating blade 15K includes a blade body 20A and a contact portion 20B, as illustrated in FIG. 5A.

Specifically, referring to FIGS. 5A to 6, the blade body 20A has a plate shape extends in the axial direction. The blade body 20A has an end E1 and another end E2. The end E1 of the blade body 20A is supported by a housing of the developing cartridge 4K. The other end E2 is positioned away from the end E1.

The contact portion 20B is provided on the blade body 20A at a position between the end E1 and the other end E2. The contact portion 20B extends in the axis direction. The contact portion 20B is in contact with a peripheral surface of the developing roller 14K. The contact portion 20B has a semicircular shape in cross-section. The contact portion 20B is made of a silicone rubber, for example. The thickness regulating blade 15K can regulate the thickness of the toner borne on the peripheral surface of the developing roller 14K into the constant thickness in accordance with rotation of the developing roller 14K with the contact portion 20B in contact with the peripheral surface of the developing roller 14K. In a normal-speed rotation process (described later), a rotation direction of the developing roller 14K at a point of contact between the developing roller 14K and the contact portion 20B (i.e., a first direction R1 depicted in FIGS. 5A to 6) is opposite to a direction from the end E1 toward the other end E2 of the blade body 20A of the thickness regulating blade 15K. The rotation direction of the developing roller 14K is referred to as a first direction R1. The normal-speed rotation process will be described later.

<Exposure Devices 5Y, 5M, 5C, and 5K>

Since the exposure devices 5Y, 5M, 5C, and 5K have the same structures as one another, the exposure device 5K will be described in detail, while descriptions on the d exposure devices 5Y, 5M, 5C will be omitted.

The exposure device 5K is configured to expose the peripheral surface of the corresponding photosensitive drum 11K to light. In the state where the drum cartridge 3K and the developing cartridge 4K are mounted in the main casing 2, the exposure device 5K is positioned downstream of the charger 12K and upstream of the developing roller 14K in the rotation direction of the photosensitive drum 11K. Specifically, in the present embodiment, the exposure device 5K is an LED array.

<Belt Unit 6>

The belt unit 6 includes a belt 16, and a plurality (four) of the transfer rollers 17Y, 17M, 17C, and 17K. In other words, the image-forming apparatus 1 includes the belt 16.

The belt 16 is in contact with each of the four photosensitive drums 11Y, 11M, 11C, and 11K. In the present embodiment, the belt 16 is an endless belt. The belt 16 is mounted over two rollers 18 and 19 and supported by the two rollers 18 and 19. The rollers 18 and 19 are arranged to be spaced away from each other in the alignment direction.

The belt 16 has a first portion 16A and a second portion 16B. The first portion 16A is positioned between the roller 18 and the roller 19 in the alignment direction. The first portion 16A extends in the alignment direction. The first portion 16A is in contact with each of the four photosensitive drums 11Y, 11M, 11C, and 11K. The second portion 16B and the photosensitive drums 11Y, 11M, 11C, and 11K are positioned opposite to each other with respect to the first portion 16A. The second portion 16B is positioned between the roller 18 and the roller 19 in the alignment direction. The second portion 16B extends in the alignment direction. The second portion 16B is in contact with the cleaner 7.

The belt 16 is circularly movable over the two rollers 18 and 19. As the belt 16 circulates, the first portion 16A moves toward the fixing device 8 in the alignment direction. In accordance with circulation of the belt 16, a sheet of paper supplied onto the first portion 16A sequentially comes into contact with the photosensitive drums 11Y, 11M, 11C, and 11K. The sheet nipped between the first portion 16A and the respective photosensitive drums 11Y, 11M, 11C, and 11K is thus conveyed toward the fixing device 8 as the belt 16 circulates.

The four transfer rollers 17Y, 17M, 17C, and 17K are positioned between the roller 18 and the roller 19 in the alignment direction. The transfer rollers 17Y, 17M, 17C, and 17K are aligned with one another in the alignment direction.

Since the transfer rollers 17Y, 17M, 17C, 17K have the same structures as one another, the transfer roller 17K will be described in detail, while descriptions on the d exposure devices 5Y, 5M, 5C will be omitted.

The transfer roller 17K is configured to allow a toner image on the photosensitive drum 11K to transfer onto the sheet conveyed by the belt 16. The transfer roller 17K is positioned opposite to the photosensitive drum 11K with respect to the first portion 16A of the belt 16.

<Cleaner 7>

The cleaner 7 is configured to clean the belt 16. In the present embodiment, the cleaner 7 is a cleaning roller. The cleaner 7 is in contact with the second portion 16B of the belt 16 from below.

<Fixing Device 8>

The fixing device 8 is configured to heat and press the sheet on which the toner image has been transferred, thereby fixing the toner image to the sheet. The sheet having passed through the fixing device 8 is configured to be discharged onto an upper face of the main casing 2.

<Sheet Feeder 9>

The sheet feeder 9 is configured to feed sheets stacked in the sheet tray 10 into a space between the first portion 16A of the belt 16 and the photosensitive drum 11Y.

<Sheet Tray 10>

The sheet tray 10 is configured to accommodate therein the sheets to be supplied to the belt unit 6 via the fixing device 8.

2. Controller of the Image-Forming Apparatus 1

Figure 2:
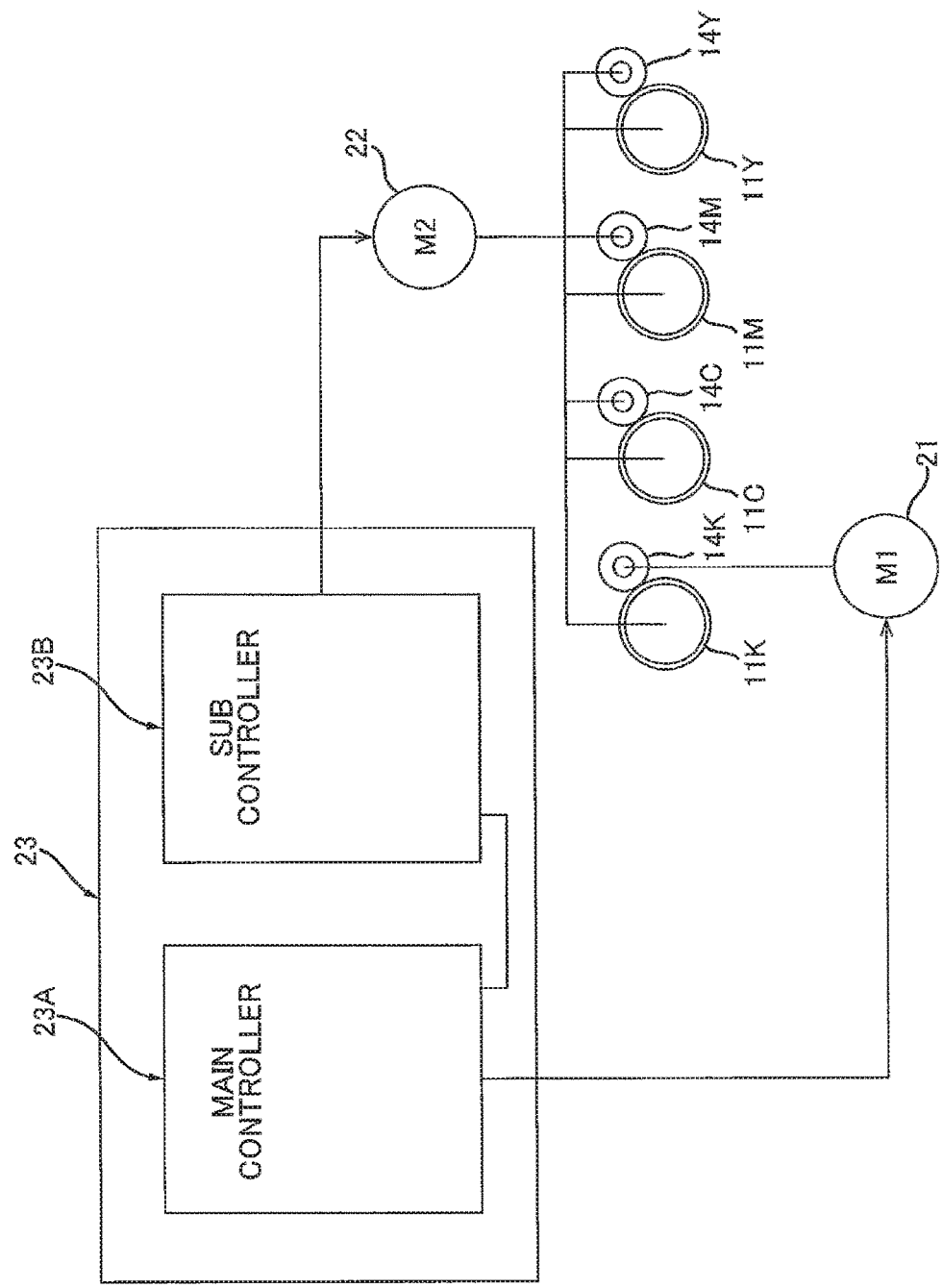
FIG. 2 is a block diagram illustrating configurations of a controller, a first motor and a second motor for controlling operations of photosensitive drums and developing rollers according to the first embodiment.

As illustrated in FIG. 2, the image-forming apparatus 1 also includes a first motor 21, a second motor 22, and a controller 23.

The first motor 21 is disposed inside the main casing 2 (see FIG. 1). The first motor 21 is configured to generate a driving force to be transmitted to the developing roller 14K. In other words, the developing roller 14K is rotatable by the driving force of the first motor 21.

The second motor 22 is also disposed inside the main casing 2. The second motor 22 is configured to generate a driving force to be transmitted to each of the photosensitive drums 11Y, 11M, 11C, and 11K, and the developing rollers 14Y, 14M, and 14C. In other words, the photosensitive drums 11Y, 11M, 11C, and 11K and the developing rollers 14Y, 14M, and 14C are rotatable by the driving force of the second motor 22.

The controller 23 is provided inside the main casing 2. The controller 23 is configured to control operations of the image-forming apparatus 1. The controller 23 includes a circuit substrate, a main controller 23A and a sub controller 23B. The main controller 23A and the sub controller 23B are mounted on the circuit substrate. The controller 23 may also include a memory for storing various data necessary for executing processes described later.

Specifically, the main controller 23A is an application specific integrated circuit (ASIC) in the present embodiment. The main controller 23A includes a circuit for controlling operations of the first motor 21. The main controller 23A is electrically connected to the first motor 21. The main controller 23A further includes: a circuit for controlling movements of the developing rollers 14Y, 14M, 14C, and 14K between the contact position and the separation position; a circuit for controlling biases (bias voltages) to be applied to the respective collecting rollers 13K, 13Y, 13M, and 13C (see FIG. 1); a circuit for controlling biases (bias voltages) to be applied to the transfer rollers 17Y, 17M, 17C, and 17K (see FIG. 1); and a circuit for controlling a bias (a bias voltage) to be applied to the cleaner 7 (see FIG. 1).

The sub controller 23B is an application specific integrated circuit (ASIC) in the present embodiment. The sub controller 23B includes a circuit for controlling operations of the second motor 22. The sub controller 23B is electrically connected to the second motor 22. The sub controller 23B is also electrically connected to the main controller 23A. The sub controller 23B communicates with the main controller 23A through synchronization signals. The sub controller 23B is thus synchronized with the main controller 23A.

3. Operations of the Image-Forming Apparatus 1

Figure 3:
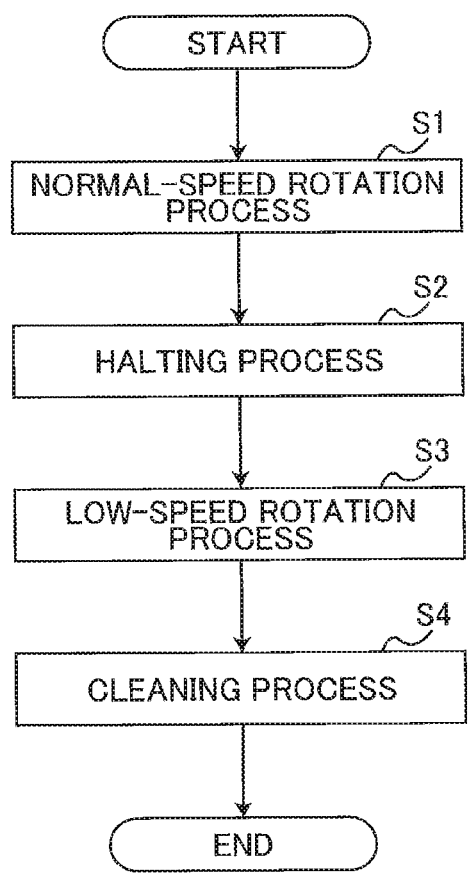
FIG. 3 is a flowchart illustrating steps in a process executed by the controller to control operations of the image-forming apparatus according to the first embodiment.
Figure 4:
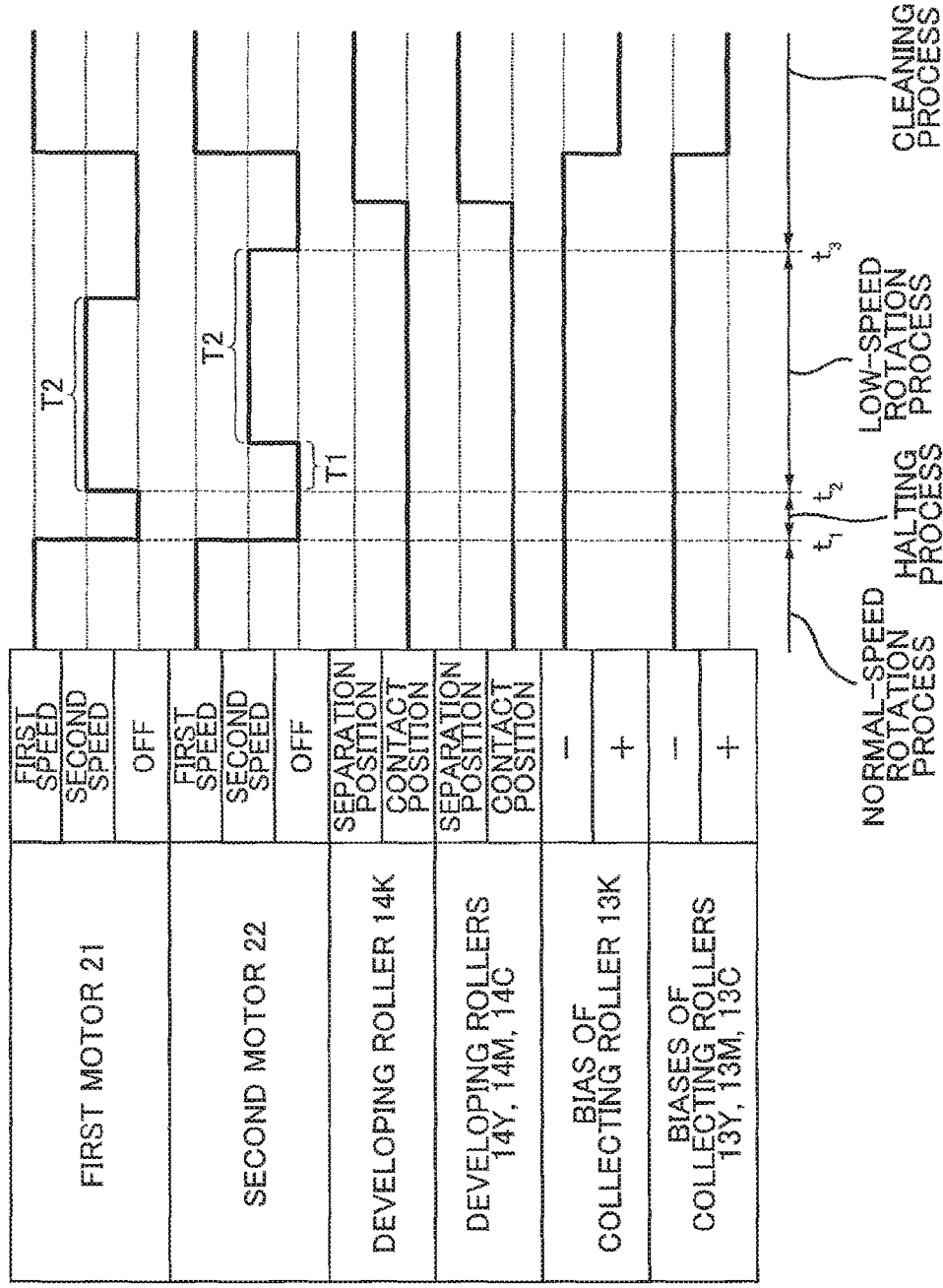
FIG. 4 is a timing chart illustrating operations of the first motor, second motor, developing rollers, and collecting rollers in the process of FIG. 3.

As illustrated in FIGS. 3 and 4, the controller 23 is configured to execute the normal-speed rotation process (S1), a halting process (S2), a low-speed rotation process (S3), and a cleaning process (S4), sequentially. Note that the halting process (S2), the low-speed rotation process (S3), and the cleaning process (S4) are configured to be executed sequentially in the recited order once the normal-speed rotation process (S1) is initiated. In other words, the execution of the normal-speed rotation process (S1) triggers sequential execution of the halting process (S2), the low-speed rotation process (S3), and the cleaning process (S4).

<Normal-Speed Rotation Process>

The controller 23 is configured to launch the normal-speed rotation process in response to receiving a prescribed signal. The prescribed signal may be a command to initiate a print operation, or may be a command to start preparation for a print operation. Specifically, in the present embodiment, the normal-speed rotation process is configured to be initiated: when the image-forming apparatus 1 forms a monochrome image; or when the image-forming apparatus 1 forms a color image; or for a certain period of time after the image-forming apparatus 1 is powered; or for a certain period of time after the image-forming apparatus 1 returns from a sleep state.

Referring to FIGS. 3 and 4, in the normal-speed rotation process in S1, the controller 23 drives the first motor 21 while the developing roller 14K is at the contact position, in order to rotate the developing roller 14K in the first direction R1 (see FIG. 5A) at a first speed. Specifically, in the present embodiment, the first speed is 200 rpm or faster. More preferably, the first speed be 270 rpm.

During rotation of the developing roller 14K at the first speed, a surface speed (circumferential speed) of the developing roller 14K is 135 m/s or faster. Preferably, the surface speed be 180 m/s.

Incidentally, during the normal-speed rotation process in S1, the controller 23 may also drive the second motor 22 to rotate the developing rollers 14Y, 14M, and 14C at the first speed, as needed. For example, the controller 23 causes the developing rollers 14Y, 14M, and 14C to rotate at the first speed in order to perform color printing at the image-forming apparatus 1.

While the normal-speed rotation process (S1) is being executed, some toner may not pass through between the contact portion 20B and the peripheral surface of the developing roller 14K. Conceivably, such toner on the peripheral surface of the developing roller 14K may be accumulated between the contact portion 20B and the peripheral surface of the developing roller 14K to form a lump of toner ("toner lump 100"), as illustrated in FIG. 5A.

<Halting Process>

The controller 23 is configured to execute the halting process in S2 after the normal-speed rotation process in S1 and before the cleaning process in S4. In the present embodiment, the execution of the normal-speed rotation process (S1) triggers the execution of the halting process (S2).

Specifically, referring to FIG. 4, the halting process is configured to be initiated at a point of time $t_1$ when the normal-speed rotation process ends (hereinafter, referred to as "timing $t_1$"). In the halting process, the controller 23 stops driving the first motor 21 while the developing roller 14K is at the contact position. The developing roller 14K is thus caused to stop rotating at the timing $t_1$.

Note that, in case that the developing rollers 14Y, 14M, and 14C are also rotated in the normal-speed rotation process in S1, the controller 23 also stops the second motor 22 while the developing rollers 14Y, 14M, and 14C are at the contact position (see FIG. 4). The developing rollers 14Y, 14M, and 14C are thus caused to stop rotating at the timing $t_1$.

Specifically, in the halting process, the main controller 23A stops driving the first motor 21 to stop rotation of the developing roller 14K (see S21 of FIG. 7A). Likewise, in case that the developing rollers 14Y, 14M, and 14C are also rotated in the normal-speed rotation process in S1, the sub controller 23B also stops driving the second motor 22 to stop rotation of the developing rollers 14Y, 14M, and 14C (see S22 in FIG. 7B).

Referring to FIG. 4, the halting process is configured to be executed for a period of time from when the main controller 23A stops the first motor 21 until when the main controller 23A starts driving the first motor 21 again. That is, the halting process is configured to be executed during a period of time from the timing $t_1$ until a point of time $t_2$ (hereinafter, referred to as "timing $t_2$").

Note that the halting process to stop rotation of the developing rollers 14Y, 14M, and 14C may also be executed for the period of time from the timing $t_1$ to the timing $t_2$, as illustrated in FIG. 4. Note that the sub controller 23B stops the second motor 22 at the same timing $t_1$ as the main controller 23A stops the first motor 21.

In the present embodiment, the halting process is configured to be executed for a period of 200 milliseconds. This is longer than such a period of time that: rotation of the first motor 21 comes to a halt after the first motor 21 receives a signal to stop the first motor 21 (OFF signal) from the main controller 23A; and rotation of the developing roller 14K actually stops subsequently. This configuration can prevent the first motor 21 from start driving again before the developing roller 14K stops rotating after the first motor 21 stops upon receipt of the OFF signal from the main controller 23A. Hence, rotation of the developing roller 14K can be reliably halted in the halting process.

As a result of execution of the halting process, as depicted in FIG. 5B, a state of contact between the thickness regulating blade 15K and the developing roller 14K is allowed to change from the state of contact during the normal-speed rotation process depicted in FIG. 5A.

More specifically, referring to FIG. 5A, while the developing roller 14K is rotating, the contact portion 20B of the thickness regulating blade 15K is pulled by the rotating developing roller 14K, due to friction with the developing roller 14K. The contact portion 20B therefore makes contact with the developing roller 14K with a relatively strong force. On the other hand, while the rotation of the developing roller 14K is halted, the contact portion 20B is not pulled by the developing roller 14K as the developing roller 14K remains stationary. Hence, the contact portion 20B can make contact with the developing roller 14K with a smaller force, compared to the force while the developing roller 14K is rotating. Therefore, while the halting process is being executed, a force applied to the toner lump 100 accumulated between the contact portion 20B and the developing roller 14K can be made smaller, compared with that applied to the toner lump 100 while the normal-speed rotation process is being executed.

With this configuration, the toner lump 100 accumulated between the contact portion 20B and the developing roller 14K is easier to break during the halting process, compared with the toner lump 100 during the normal-speed rotation process. Therefore, the toner lump 100 accumulated between the contact portion 20B and the developing roller 14K can easily collapse and pass through between the thickness regulating blade 15K and the developing roller 14K during the low-speed rotation process which is to be executed after the halting process (see S3 in FIGS. 3 and 4).

<Low-Speed Rotation Process>

As illustrated in FIGS. 3 and 4, the low-speed rotation process (S3) is configured to be executed after the normal-speed rotation process (S1) and prior to the cleaning process (S4). Particularly, the low-speed rotation process (S3) is configured to be executed after the halting process (S2) and before the cleaning process (S4). In the present embodiment, the execution of the halting process (S2) triggers the execution of the low-speed rotation process (S3).

Specifically, referring to FIG. 4, the low-speed rotation process is configured to be stated at a timing when the halting process ends. More specifically, the low-speed rotation process is configured to be executed at the timing $t_2$.

The second speed is equal to or below two-thirds of the first speed. Preferably, the second speed be equal to or below one-third of the first speed. Specifically, in the present embodiment, the second speed is 90 rpm or slower. The developing roller 14K rotating at the second speed provides a surface speed equal to 60 m/s or faster.

In the low-speed rotation process in S3, the controller 23 drives the first motor 21 while maintaining the developing roller 14K at the contact position. Specifically, the main controller 23A executes the process illustrated in FIG. 7A. The developing roller 14K, which stops rotating during the halting process, is caused to start rotating in the first direction R1 at a second speed slower than the first speed.

In the case where the developing rollers 14Y, 14M, and 14C are also rotated in the normal-speed rotation process in S1, the controller 23 also drives the second motor 22 in the low-speed rotation process. Specifically, the sub controller 23B executes the process illustrated in FIG. 7B to cause the developing rollers 14Y, 14M, and 14C to start rotating at the second speed in the first direction R1.

Specifically, as illustrated in FIG. 7A, after stopping the first motor 21 in S21, the main controller 23A determines in S30 whether the period for the halting process (i.e., the time span from the timing $t_1$ to the timing $t_2$ in FIG. 4) has elapsed. The main controller 23A repeats the routine in S30 until the period for the halting process is determined to have elapsed (S30: NO). When the period for the halting process has elapsed (S30: YES), the main controller 23A drives the first motor 21 in S31 to initiate the low-speed rotation process for the developing roller 14K.

On the other hand, referring to FIG. 7B, after stopping the second motor 22 in S22 to end the normal-speed rotation process, the sub controller 23B determines in S32 whether the period for the halting process (i.e., the time span from the timing $t_1$ until the timing $t_2$) has elapsed. The sub controller 23B repeats the routine in S32 until the period for the halting process is determined to have elapsed (S32: NO). Once the period for the halting process is determined to have elapsed (S32: YES), the sub controller 23B then determines in S33 whether a prescribed first period of time T1 ("first period T1") has elapsed. When the first period T1 is determined to have elapsed (S33: YES), the sub controller 23B starts driving the second motor 22 in S34 to initiate the low-speed rotation process for the developing rollers 14Y, 14M and 14C.

In this way, as illustrated in FIG. 4, the sub controller 23B starts driving the second motor 22 after the prescribed first period T1 has elapsed since when the first motor 21 is driven again by the main controller 23A for the low-speed rotation process. The low-speed rotation process is executed for the developing rollers 14Y, 14M, and 14C when the first period T1 has elapsed from the timing $t_2$.

The first period T1 is set so that a timing at which the first motor 21 starts driving does not overlap with a timing at which the second motor 22 starts driving in order to suppress excessive increase in electrical load to be applied to the image-forming apparatus 1. Specifically, in the present embodiment, the first period T1 is 200 milliseconds.

Referring back to FIG. 7A, after the first motor 21 is driven in S31, the main controller 23A determines in S35 whether a prescribed second period of time T2 ("second period T2") has elapsed. The main controller 23A continues driving the first motor 21 at the second speed until the second period T2 is determined to have elapsed (S35: NO). Once the second period T2 is determined to have passed (S35: YES), the main controller 23A stops driving the first motor 21 in S36.

The second period T2 is set such that a portion on the peripheral surface of the photosensitive drum 11K does not come into contact with the developing roller 14K, the portion having not yet been charged by the charger 12K. Specifically, the second period T2 ranges from 0.15 seconds to 3.15 seconds inclusive. The second period T2 may be set beforehand so that a user cannot change the second period T2. Alternatively, the second period T2 may be set so that the second period T2 can be changed later by a user as desired.

On the other hand, in case that the as illustrated in FIG. 7B, after the second motor 22 is driven in S34, the sub controller 23B determines in S37 whether the prescribed second period T2 has elapsed. The sub controller 23B continues driving the second motor 22 at the second speed until the second period T2 is determined to have elapsed (S37: NO). Once the second period T2 is determined to have passed (S37: YES), the sub controller 23B stops driving the second motor 22 in S38.

As illustrated in FIG. 4, the low-speed rotation process is configured to be executed during a period of time from when the main controller 23A starts driving the first motor 21 (at the timing $t_2$) until when the sub controller 23B stops driving the second motor 22 (at a point of time $t_3$, or "timing $t_3$", hereinafter). In other words, the low-speed rotation process is configured to be executed during a time span between the timing $t_2$ and the timing $t_3$.

During the low-speed rotation process, the rotation speed of the developing roller 14K becomes slower, compared with the rotation speed during the normal-speed rotation process. A frictional force acting between the contact portion 20B of the thickness regulating blade 15K and the developing roller 14K thus becomes smaller during the low-speed rotation process. Therefore, the contact portion 20B contacts the peripheral surface of the developing roller 14K in a weaker manner (not strongly) during the low-speed rotation process (depicted in FIG. 6) than during the normal-speed rotation process (depicted in FIG. 5A).

With this configuration, while the low-speed rotation process is being executed, the toner lump 100 is easier to pass through between the thickness regulating blade 15K and the peripheral surface of the developing roller 14K than while the normal-speed rotation process is being executed (see FIG. 5A). As a result, as depicted in FIG. 6, the toner lump 100 accumulated between the contact portion 20B and the developing roller 14K can pass through between the thickness regulating blade 15K and the developing roller 14K while the low-speed rotation process is being executed. The toner lump 100 passed through between the thickness regulating blade 15K and the developing roller 14K is collected into the developing cartridge 4K (see FIG. 1) as the developing roller 14K rotates.

<Cleaning Process>

As illustrated in FIG. 3, the cleaning process is configured to be executed in S4 after the low-speed rotation process is executed in S3. In the present embodiment, the execution of the low-speed rotation process (S3) triggers the execution of the cleaning process (S4). In other words, in the present embodiment, the execution of the normal-speed rotation process (S1) necessitates the execution of the cleaning process (S4).

Specifically, referring to FIG. 4, the cleaning process is configured to be started when the low-speed rotation process ends, i.e., at the timing $t_3$.

In the cleaning process, referring to FIG. 8, while each of the developing rollers 14Y, 14M, 14C, and 14K is at the separation position, residual toner collected by the collecting rollers 13Y, 13M, 13C, and 13K is moved therefrom onto the photosensitive drums 11Y, 11M, 11C, and 11K, respectively. The residual toner moved to each of the photosensitive drums 11Y, 11M, 11C, and 11K is then moved onto the first portion 16A of the belt 16. The residual toner moved to the belt 16 is then collected by the cleaner 7.

Specifically, as illustrated in FIG. 4, the controller 23 first causes each of the developing rollers 14Y, 14M, 14C, and 14K to move into the separation position.

Next, the controller 23 applies a bias (bias voltage) having a positive polarity (+) to each of the collecting rollers 13K, 13Y, 13M, and 13C. The polarity (+) is the same as a polarity (+) with which the residual toner is charged. A repulsive force thus occurs between each of the collecting rollers 13K, 13Y, 13M, and 13C and the residual toner collected by each of the collecting rollers 13K, 13Y, 13M, and 13C.

Accordingly, the residual toner collected by the collecting roller 13K is moved onto the photosensitive drum 11K. The residual toner collected by the collecting roller 13Y is moved onto the photosensitive drum 11Y. The residual toner collected by the collecting roller 13M is moved onto the photosensitive drum 11M. The residual toner collected by the collecting roller 13C is moved onto the photosensitive drum 11C.

Note that, in the normal-speed rotation process, the halting process, and the low-speed rotation process, the controller 23 applies a bias (bias voltage) having a negative polarity (−) to each of the collecting rollers 13K, 13Y, 13M, and 13C. The polarity (−) is opposite to the polarity (+) with which the residual toner is charged. An attracting force thus occurs between each of the collecting rollers 13K, 13Y, 13M, and 13C and the residual toner thereon.

The residual toner having moved to the photosensitive drum 11K is then moved onto the belt 16 by the transfer roller 17K. Likewise, the residual toner having moved to the photosensitive drum 11Y is then moved onto the belt 16 by the transfer roller 17Y. The residual toner having moved to the photosensitive drum 11M is then moved onto the belt 16 by the transfer roller 17M. The residual toner having moved to the photosensitive drum 11C is then moved onto the belt 16 by the transfer roller 17C. As the belt 16 circulates, the residual toner having moved to the belt 16 arrives at the cleaner 7 and is collected by the cleaner 7, thereby cleaning the belt 16.

The cleaning process is thus terminated.

4. Operational and Technical Advantages of the First Embodiment

In the image-forming apparatus 1 according to the first embodiment, as illustrated in FIG. 4, the developing roller 14K is configured to stop rotating once in the halting process after the normal-speed rotation process. The developing roller 14K is subsequently caused to rotate again in the low-speed rotation process at the second speed slower than the first speed for the normal-speed rotation process.

With this configuration, as illustrated in FIG. 5A through 6, even if the toner accumulates over the developing roller 14K during the normal-speed rotation process, the accumulated toner becomes easier to break during the halting process and low-speed rotation process executed after the normal-speed rotation process.

As a result, a lump of the toner is less likely to be formed on the peripheral surface of developing roller 14K. Toner is thus less likely to leak from around the developing roller 14K.

Similar advantages can be obtained for the developing rollers 14Y, 14M, and 14C.

Second Embodiment

A second embodiment will be hereinafter described with reference to FIG. 9. Like parts and components are designated by the same reference numerals as those of the first embodiment in order to avoid duplicating description.

In the second embodiment, the halting process (S2) is configured to be performed if a number of continuous rotations N of the photosensitive drum 11K during the normal-speed rotation process (S1) is determined to be equal to or larger than a predetermined number of continuous rotations N1 ("continuous-rotation number N1").

Figure 9:
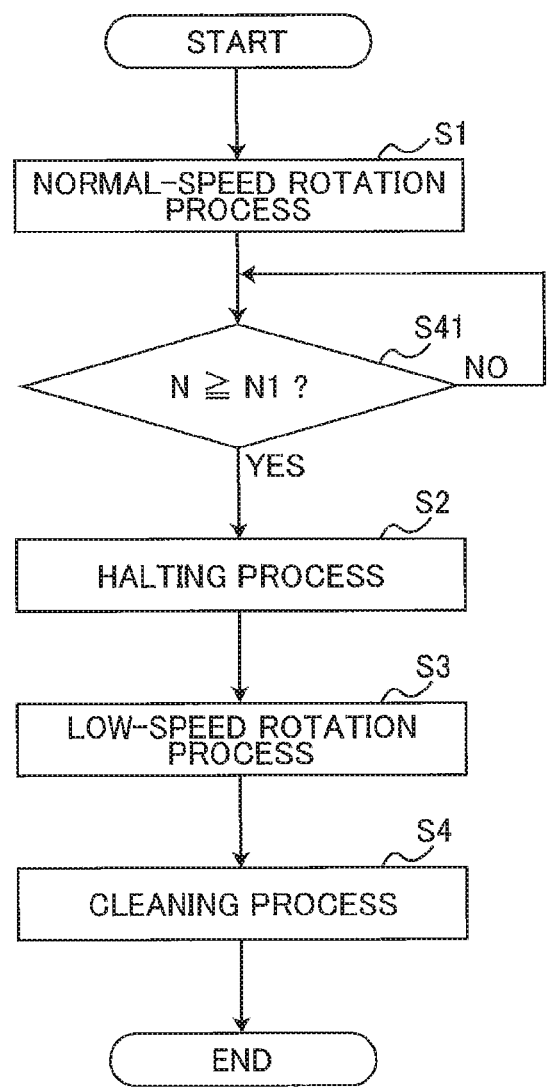
FIG. 9 is a flowchart illustrating steps in a process executed by a controller to control operations of an image-forming apparatus according to a second embodiment.

Specifically, in the second embodiment, a process depicted in FIG. 9 is configured to be executed instead of the process depicted in FIG. 3 of the first embodiment. For example, the process of FIG. 9 may be executed for a case where the photosensitive drum 11K rotates successively to perform image formation on a plurality of sheets of paper.

More specifically, referring to FIG. 9, in the second embodiment, the controller 23 is further configured to count how many times the photosensitive drum 11K rotates continuously while executing the normal-speed rotation process in S1.

The controller 23 then determines in S41 whether the number of continuous rotations N of the photosensitive drum 11K during the normal-speed rotation process is equal to or larger than the predetermined continuous-rotation number N1. The controller 23 repeats the routine of S41 as long as the number of continuous rotations N of the photosensitive drum 11K is smaller than the predetermined continuous-rotation number N1 (S41: NO).

On the other hand, once the number of continuous rotations N reaches the predetermined continuous-rotation number N1 or larger (S41: YES), the controller 23 then executes the halting process (S2).

The predetermined continuous-rotation number N1 may be set to such a number that how many times the photosensitive drum 11K is required to rotate in order to feed 60 sheets of paper of A4 size, for example. Specifically, if a diameter of the photosensitive drum 11K ranges from 20 mm to 50 mm inclusive, the continuous-rotation number N1 may range from 100 rotations to 400 rotations (100 times to 400 times) inclusive, for example.

More specifically, in a case where the diameter of the photosensitive drum 11K is 30 mm, the predetermined continuous-rotation number N1 may range from 200 rotations to 240 rotations inclusive. Alternatively, in a case where the diameter of the photosensitive drum 11K is 20 mm, the predetermined continuous-rotation number N1 may range from 300 rotations to 350 rotations inclusive.

With this configuration, the halting process (S2), the low-speed rotation process (S3), and the cleaning process (S4) can be executed at such a timing that the toner is predicted to be accumulated on the developing roller 14K.

In case of color image formation, the processing depicted in FIG. 9 may also be executed for the photosensitive drums 11Y, 11M and 11C and the developing rollers 14Y, 14M, and 14C.

The same or similar advantages as the first embodiment can also be obtained in the second embodiment.

Third Embodiment

A third embodiment will be hereinafter described with reference to FIGS. 10 and 11A. In the third embodiment, identical reference numerals are used to denote identical or substantially identical members in the second embodiment. Descriptions of such members are thus omitted.

Figure 10:
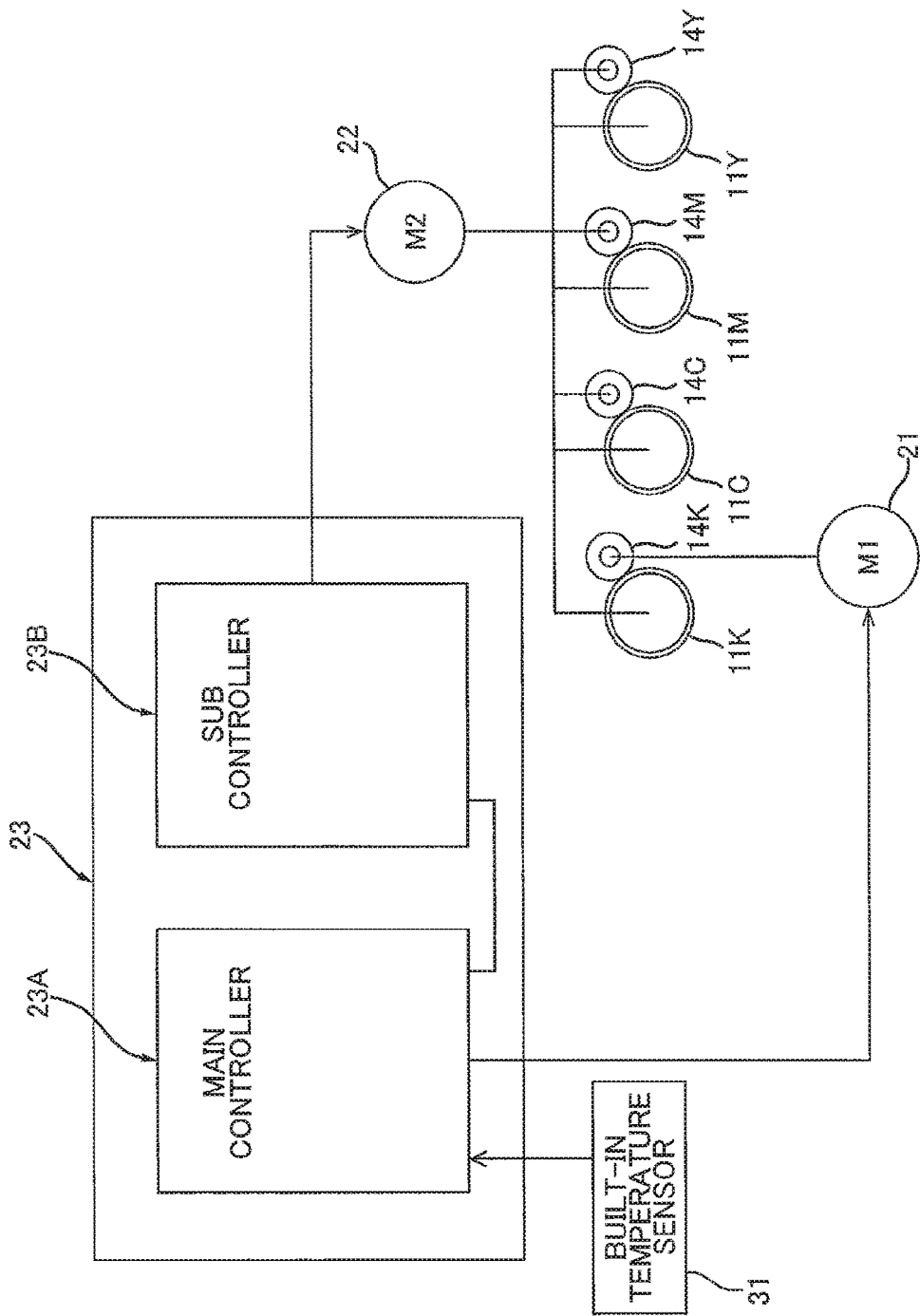
FIG. 10 is a block diagram illustrating configurations of a controller, a first motor and a second motor according to a third embodiment.

As illustrated in FIG. 10, the image-forming apparatus 1 may further include a built-in temperature sensor 31. The built-in temperature sensor 31 is configured to measure a temperature H inside the image-forming apparatus 1. The built-in temperature sensor 31 is electrically connected to the main controller 23A. The main controller 23A is configured to measure the temperature H inside the image-forming apparatus 1 based on electric signals outputted from the built-in temperature sensor 31.

In the third embodiment, the halting process (S2) and low-speed rotation process (S3) are configured to be performed: if the number of continuous rotations N of the photosensitive drum 11K in the normal-speed rotation process (S1) becomes larger than the predetermined continuous-rotation number N1; and if the temperature H inside the image-forming apparatus 1 exceeds a predetermined temperature H1.

Figure 11A:
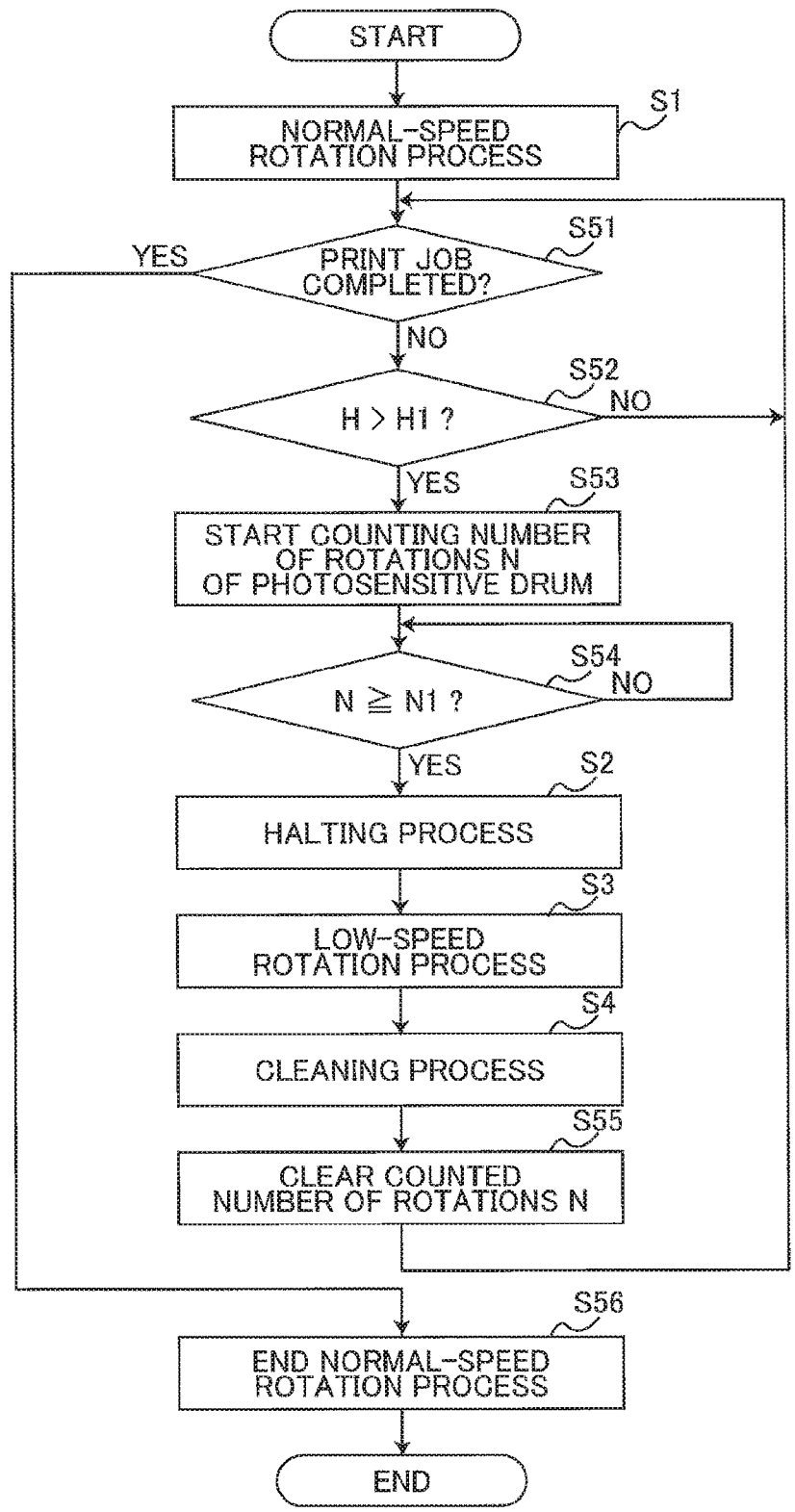
FIG. 11A is a flowchart illustrating steps in a process executed by the controller to control operations of an image-forming apparatus according to the third embodiment.

Specifically, referring to FIG. 11A, the controller 23 determines in S51 whether a print job is completed after starting the normal-speed rotation process in S1.

When the print job is not completed yet (S51: NO), the controller 23 then determines in S52 whether the temperature H inside the image-forming apparatus 1 exceeds the predetermined temperature H1.

If the temperature H is still below the predetermined temperature (S52: NO), the routine goes back to S51 to repeat the determination in S51. On the other hand, if the temperature H is determined to exceed the predetermined temperature H1 (S52: YES), the controller 23 starts counting for the number of continuous rotations N of the photosensitive drum 11K in S53.

The controller 23 keeps counting for the number of continuous rotations N of the photosensitive drum 11K as long as the number of continuous rotations N of the photosensitive drum 11K is determined to be smaller than the predetermined continuous-rotation number N1 (S54: NO).

Upon determining that the number of continuous rotations N of the photosensitive drum 11K has reached the predetermined continuous-rotation number N1 (S54: YES), the controller 23 terminates the normal-speed rotation process started in S1. The controller 23 then executes the halting process (S2), the low-speed rotation process (S3), and the cleaning process (S4), as in the first embodiment.

After executing the cleaning process in S4, the controller 23 resets the number of continuous rotations N of the photosensitive drum 11K in S55. In other words, the controller 23 sets the number of continuous rotations N of the photosensitive drum 11K to zero.

The routine then goes back to the routine of S51 to determine whether the print job is completed. If the printing job is determined to be completed (S51: YES), the controller 23 terminates the normal-speed rotation process in S56 and then ends the process of FIG. 11A.

Alternatively, the controller 23 may be configured to execute the halting process (S2), low-speed rotation process (S3) and cleaning process (S4) after the normal-speed rotation process is ended in S56.

Incidentally, in a case where the routine goes back to S51 after S54 and the print job is determined not to be completed yet (S51: NO), the controller 23 tends to determine in S52 that the temperature H inside the image-forming apparatus 1 exceeds the predetermined temperature H1 again (S52: YES), since the temperature H is unlikely to drop suddenly at this moment.

As the temperature H inside the image-forming apparatus 1 rises, the toner accumulated over the developing roller 14K becomes easier to adhere to each other. The toner thus tends to become harder easily.

Hence, in the third embodiment, the predetermined temperature H1 is set to such a temperature that the toner is presumed to become harder based on a melting point of the toner, for example.

With this configuration, in the third embodiment, the halting process (S2), the low-speed rotation process (S3), and the cleaning process (S4) can be executed in the case where the temperature H inside the image-forming apparatus 1 exceeds the predetermined temperature H1 at which the toner is presumed to harden.

In the third embodiment, the same or similar advantages as the second embodiment can also be obtained.

Note that, the built-in temperature sensor 31 of the third embodiment may not be provided. In this case, instead of detecting the temperature H inside the image-forming apparatus 1 using the built-in temperature sensor 31, the controller 23 may determine that the temperature H inside the image-forming apparatus 1 has exceeded the predetermined temperature H1 if the number of continuous rotations N of the photosensitive drum 11K during the normal-speed rotation process (S1) reaches a predetermined number of continuous rotations N2 ("continuous-rotation number N2") or larger. The halting process (S2) and the low-speed rotation process (S3) may then be executed.

Figure 11B:
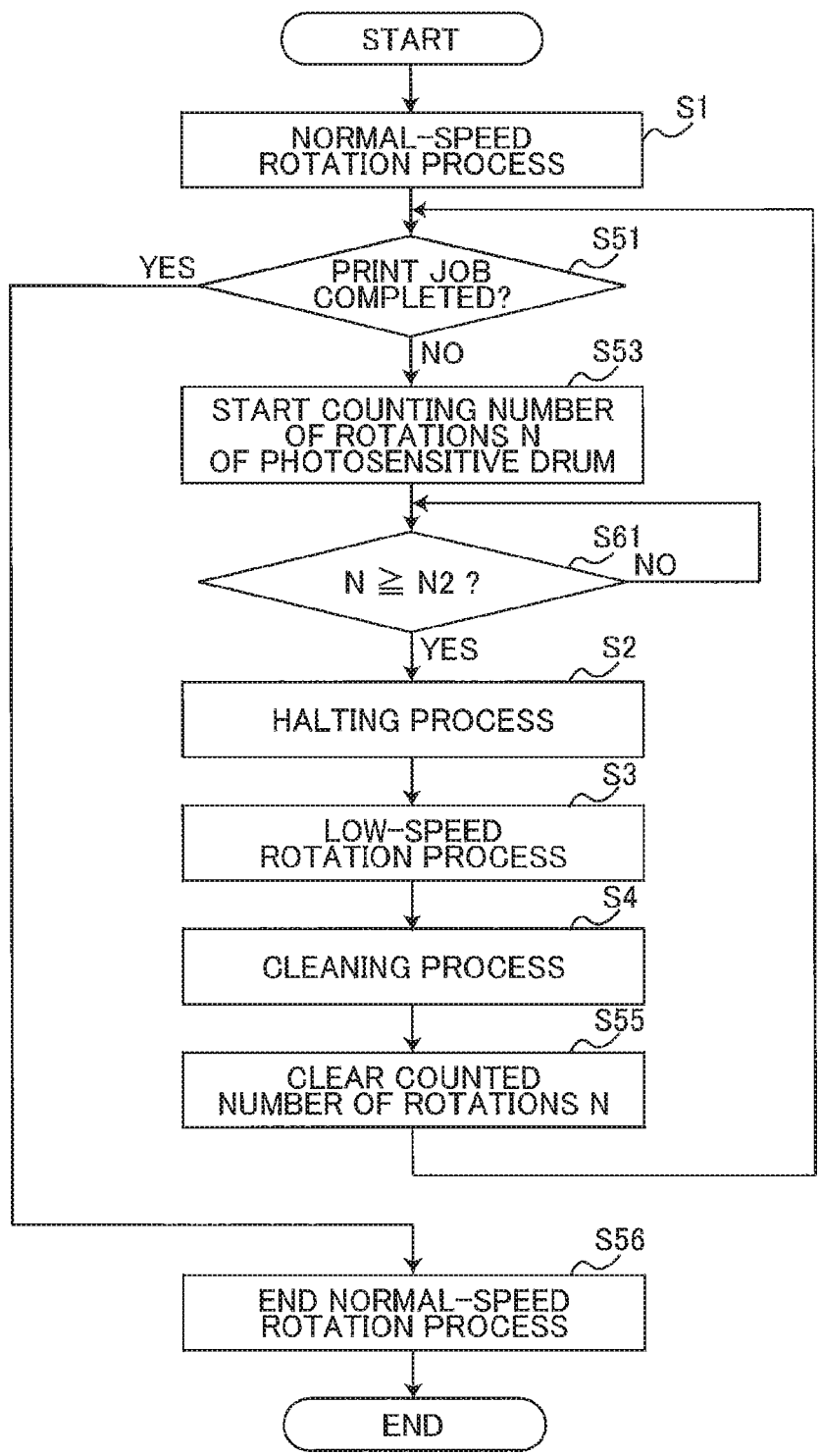
FIG. 11B is a flowchart illustrating steps in a process executed by a controller to control operations of an image-forming apparatus according to a variation of the third embodiment.

More specifically, referring to FIG. 11B, the controller 23 does not execute the determination of S52 of the third embodiment; the controller 23 is configured to start counting the number of continuous rotations N of the photosensitive drum 11K in S53 immediately after the determination in S51.

Here, the predetermined continuous-rotation number N2 is a value different from a value of the predetermined continuous-rotation number N1. For example, the predetermined continuous-rotation number N2 may be a number of rotations required for the photosensitive drum 11K to feed 540 sheets of paper of A4 size.

After starting the counting in S53, the controller 23 then determines in S61 whether the number of continuous rotations N of the photosensitive drum 11K during the normal-speed rotation process (S1) is equal to or larger than the predetermined continuous-rotation number N2. The controller 23 repeats the determination in S61 until the number of continuous rotations N of the photosensitive drum 11K has reached the predetermined continuous-rotation number N2 or larger (S61: NO). Once the number of continuous rotations N of the photosensitive drum 11K is determined to exceed the predetermined continuous-rotation number N2 (S61: YES), the controller 23 executes the halting process (S2) and the low-speed rotation process (S3) as in the third embodiment.

In case of color image formation, the controller 23 may execute the processing depicted in FIGS. 11A and 11B for the photosensitive drums 11Y, 11M and 11C and the developing rollers 14Y, 14M, and 14C.

Fourth Embodiment

A fourth embodiment will be hereinafter described with reference to FIGS. 12 to 13C. In the fourth embodiment, identical reference numerals are used to denote identical or substantially identical members in the first embodiment. Descriptions of such members are thus omitted.

Figure 12:
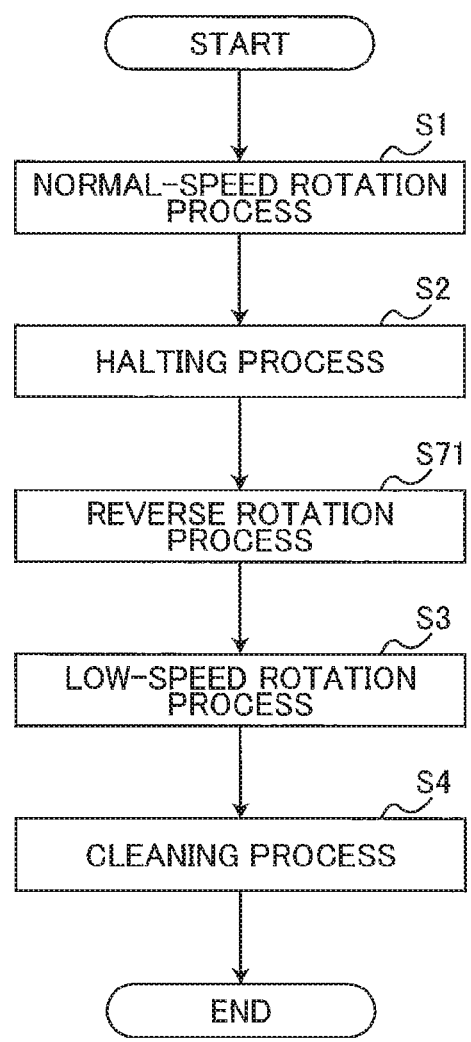
FIG. 12 is a flowchart illustrating steps in a process executed by a controller to control operations of an image-forming apparatus according to a fourth embodiment.

Referring to FIG. 12, in the fourth embodiment, the controller 23 is configured to further execute a reverse rotation process (S71) between the halting process (S2) and the low-speed rotation process (S3).

In the reverse rotation process in S71, the developing roller 14K is caused to rotate in a second direction R2 opposite to the first direction R1. At this time, the developing roller 14K may be rotatable at the first speed or at the second speed. The developing roller 14K is then caused to rotate in the first direction R1 at the second speed in the low-speed rotation process in S3.

Figure 13A:
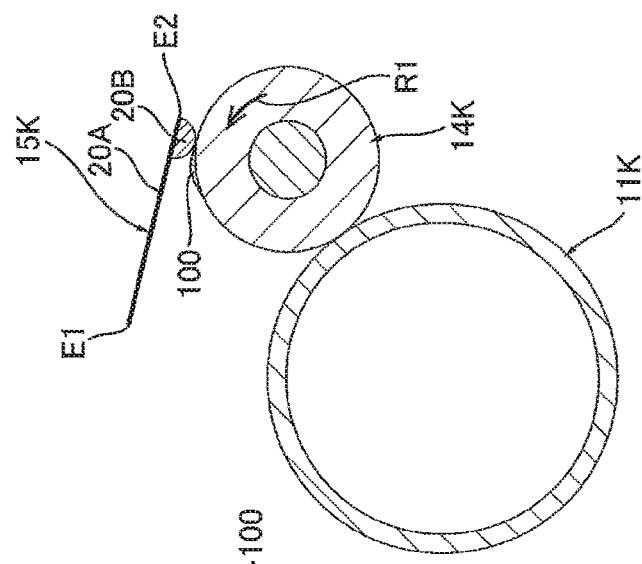
FIGS. 13A through 13C are explanatory views illustrating a state of toner accumulated between a thickness regulating blade and its corresponding developing roller according to the fourth embodiment.
Figure 13B:
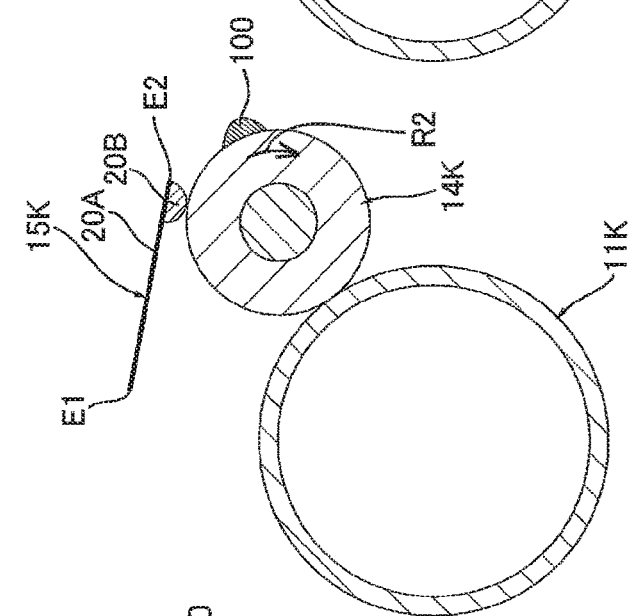
Figure 13C:
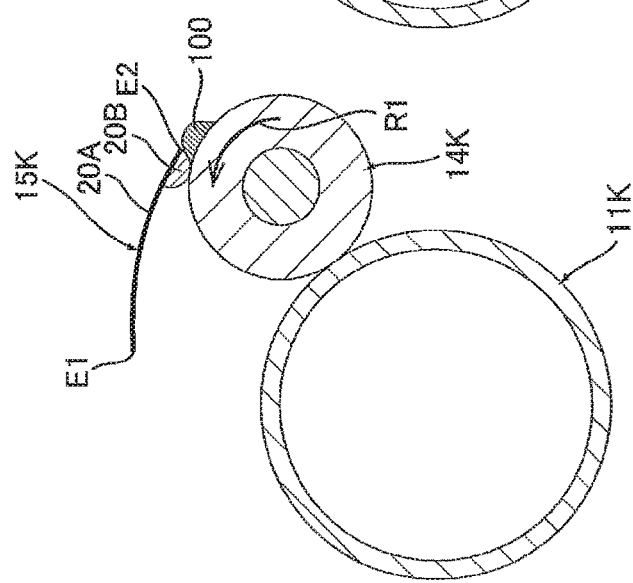

That is, as illustrated in FIGS. 13A to 13C, the toner on the developing roller 14K can be moved in the first direction R1 (in the low-speed rotation process of S3) after being moved once in the second direction R2 (in the reverse rotation process of S71) in the fourth embodiment. The toner on the developing roller 14K is allowed to reliably collapse on the peripheral surface of the developing roller 14K.

In the fourth embodiment, the same or similar advantages as the first embodiment can also be obtained.

In case of color image formation, the controller 23 may execute the processing depicted in FIG. 12 for the photosensitive drums 11Y, 11M and 11C and the developing rollers 14Y, 14M, and 14C.

Variations and Modifications

Hereinafter, various modifications to the depicted embodiments will be described. In the following description, like parts and components are designated by the same reference numerals as those in the above-described embodiments.

1. Transmission of Driving Forces

How to transmit the driving forces from the first motor 21 and the second motor 22 to each of the photosensitive drums 11Y, 11M, 11C, and 11K and each of the developing rollers 14Y, 14M, 14C, and 14K is not particularly limited to that disclosed in the above-depicted embodiments.

For example, as illustrated in FIG. 14, the driving force of the first motor 21 may be transmitted to each of the photosensitive drums 11Y, 11M, 11C, and 11K, while the driving force of the second motor 22 may be transmitted to each of the developing rollers 14Y, 14M, 14C, and 14K.

Alternatively, as illustrated in FIG. 15, the driving force of the first motor 21 may be transmitted to all of the photosensitive drums 11Y, 11M, 11C, and 11K and the developing rollers 14Y, 14M, 14C, and 14K. That is, the second motor 22 may be dispensed with. Hence, a controller 123 of this variation may not include the sub controller 23B for controlling the second motor 22.

2. Variations of the Thickness Regulating Blade 15K

The configuration of the thickness regulating blade 15K is not particularly limited to that of the first embodiment.

For example, FIG. 16A depicts a thickness regulating blade 215K that does not include the contact portion 20B of the first embodiment.

Alternatively, FIG. 16B illustrates a thickness regulating blade 315K including a contact portion 320B. Unlike the contact portion 20B of the first embodiment, the contact portion 320B is formed by bending a tip end portion of the blade body 20A.

Still alternatively, FIG. 16C illustrates a thickness regulating blade 415K including a contact portion 420B having a generally rectangular-shaped cross-section. The contact portion 420B may be made of a rubber material, for example.

Still alternatively, as illustrated in FIGS. 16D to 16G, the thickness regulating blade 15K of FIGS. 16A to 16C may be arranged such that a direction from the end E1 to the other end E2 coincides with the first direction R1 during the normal-speed rotation process.

Specifically, FIG. 16D depicts a thickness regulating blade 215K' without the contact portion 20B of the embodiment, as a variation of the thickness regulating blade 215K of FIG. 16A.

FIG. 16E depicts a thickness regulating blade 315K' including the contact portion 320B, as a variation of the thickness regulating blade 315K of FIG. 16A.

FIG. 16F depicts a thickness regulating blade 415K' as a variation of the thickness regulating blade 415K of FIG. 16C. The thickness regulating blade 415K' includes a blade body 420A and a contact portion 420B' having a rectangular-shaped cross-section.

Incidentally, the contact portion 420B' may not contact the peripheral surface of the developing roller 14K with a lower surface of the contact portion 420B' as illustrated in FIG. 16F. For example, as shown in FIG. 16G, the thickness regulating blade 415K' may be arranged such that a corner portion of the contact portion 420B' may make contact with the peripheral surface of the developing roller 14K.

Similar to the thickness regulating blade 15K, the configurations of thickness regulating blades 15Y, 15M, and 15C are not limited to those depicted in the first embodiment. For example, the thickness regulating blades 15Y, 15M, and 15C may be configured as the thickness regulating blades 215K, 315K, 415K, 215K', 315K' and 415K' illustrated in FIGS. 16A through 16G.

3. Other Variations

The image-forming apparatus 1 may be a machine dedicated solely for forming monochrome images. Alternatively, the image-forming apparatus 1 may be an intermediate transfer type image-forming apparatus.

Further, although the cleaner 7 of the depicted embodiments is configured as a cleaning roller, the cleaner 7 may be configured as cleaning blade.

Note that the depicted embodiments and modifications thereto described above may be appropriately combined with one another, as long as no contradiction is involved.

It would be apparent to those skilled in the art that the embodiment and foregoing modifications described above are merely an illustrative example of the present disclosure and that various modifications may be made therein without departing from the scope of the disclosure.

[Remarks]

The image-forming apparatus 1 is an example of an image-forming apparatus. The photosensitive drums 11K, 11Y, 11C and 11M are an example of a photosensitive drum. The developing rollers 14K, 14Y, 14C and 14M are an example of a developing roller. The collecting rollers 13K, 13Y, 13C and 13M are an example of a collecting roller. The belt 16 is an example of a belt. The cleaner 7 is an example of a cleaner. The controllers 23, 123 are an example of a controller. The normal-speed rotation process executed in S1 of the processing of FIGS. 3, 9, 11A, 11B and 12 is an example of a first process. The halting process executed in S2 of the processing of FIGS. 3, 9, 11A, 11B and 12 is an example of (a) causing. The low-speed rotation process executed in S3 of the processing of FIGS. 3, 9, 11A, 11B and 12 is an example of (b) causing. The cleaning process executed in S4 of the processing of FIGS. 3, 9, 11A, 11B and 12 is an example of a second process. The determination executed in S54 of the processing of FIG. 11A is an example of (c) determining. The determination executed in S52 of the processing of FIG. 11A is an example of (d) determining. The determination executed in S41 of the processing of FIG. 9 and the determination executed in S61 of the processing of FIG. 11B is an example of (e) determining. The reverse rotation process executed in S71 of the processing of FIG. 12 is an example of (f) causing.

What is claimed is:

1. An image-forming apparatus comprising:
   a photosensitive drum;
   a developing roller rotatable to supply toner to the photosensitive drum, the developing roller being movable between a contact position in contact with the photosensitive drum and a separation position spaced away from the photosensitive drum;
   a collecting roller rotatable to collect residual toner on the photosensitive drum;
   a belt in contact with the photosensitive drum;
   a cleaner in contact with the belt and capable of collecting the residual toner on the belt; and
   a controller configured to perform a process in response to receiving a prescribed signal, the process starting with a first process and ending with a second process,
   in the first process, the controller causing the developing roller to rotate at a first speed in a first direction while maintaining the developing roller at the contact position in contact with the photosensitive drum, the first process being executed in response to receiving the prescribed signal,
   in the second process, the controller causing the collecting roller to move the residual toner thereon to the photosensitive drum and then to the belt to allow the cleaner to collect the residual toner on the belt while maintaining the developing roller at the separation position spaced away from the photosensitive drum, and
   the process further comprising:
      (a) causing the developing roller to halt rotating for a prescribed period of time while maintaining the developing roller at the contact position in contact with the photosensitive drum, the (a) causing being executed after the first process; and
      (b) causing the developing roller having stopped rotating in the (a) causing to start rotating at a second speed lower than the first speed in the first direction while maintaining the developing roller at the contact position in contact with the photosensitive drum, the (b) causing being executed after the (a) causing and prior to the second process.

2. The image-forming apparatus according to claim 1, wherein the process further comprises:
   (c) determining whether a number of continuous rotations of the photosensitive drum during the first process is equal to or greater than a prescribed number of rotations, the (c) determining being executed after the first process; and
   (d) determining whether a temperature within the image-forming apparatus exceeds a prescribed temperature, the (d) determining being executed after the first process,
   wherein the (a) causing and the (b) causing are executed, after the first process and prior to the second process:
      when the (c) determining determines that the number of continuous rotations of the photosensitive drum during the first process is equal to or greater than the prescribed number of rotations; and
      when the (d) determining determines that the temperature within the image-forming apparatus exceeds the prescribed temperature.

3. The image-forming apparatus according to claim 1, wherein the process further comprises (e) determining whether a number of continuous rotations of the photosensitive drum during the first process is equal to or greater than a prescribed number of rotations, the (e) determining being executed after the first process, and
   wherein the (a) causing and the (b) causing are executed, after the first process and prior to the second process, when the (e) determining determines that the number of continuous rotations of the photosensitive drum during the first process is equal to or greater than the prescribed number of rotations.

4. The image-forming apparatus according to claim 1, wherein the process further comprises (f) causing the developing roller to rotate in a second direction opposite to the first direction, the (f) causing being executed after the (a) causing but prior to the (b) causing.

5. The image-forming apparatus according to claim 1, wherein the second speed is equal to or below two-thirds of the first speed.

6. The image-forming apparatus according to claim 5, wherein the second speed is equal to or below one-third of the first speed.

7. The image-forming apparatus according to claim 1, wherein the first speed is equal to or greater than 200 rpm, and
   wherein the second speed is equal to or greater than 90 rpm.

8. The image-forming apparatus according to claim 1, wherein the developing roller rotating at the first speed provides a surface speed that is equal to or greater than 135 m/s, and
 wherein the developing roller rotating at the second speed provides a surface speed that is equal to or greater than 60 m/s.

9. The image-forming apparatus according to claim 1, wherein the prescribed signal is a command to initiate a print job, and
 wherein the first process is executed to form a toner image on the photosensitive drum.

10. The image-forming apparatus according to claim 1, wherein the prescribed signal is a command to start preparation for a print job, the prescribed signal being issued when the image-forming apparatus is powered on.

11. The image-forming apparatus according to claim 1, wherein the prescribed signal is a command to start preparation for a print job, the prescribed signal being issued when the image-forming apparatus returns from a sleep state.

12. The image-forming apparatus according to claim 1, further comprising a blade in contact with a peripheral surface of the developing roller and configured to regulate a thickness of the toner carried on the peripheral surface of the developing roller.

13. The image-forming apparatus according to claim 12, wherein the blade comprises:
 a blade body having a plate shape; and
 a contact portion in contact with the peripheral surface of the developing roller and made of a silicone rubber.

14. An image-forming apparatus comprising:
 a photosensitive drum;
 a developing roller rotatable to supply toner to the photosensitive drum;
 a collecting roller rotatable to collect residual toner on the photosensitive drum; and
 a controller configured to perform a process in response to receiving a command to initiate a print job, the process comprising:
  (a) rotating the photosensitive drum and rotating the developing roller at a first speed in a first direction to form a toner image on the photosensitive drum while maintaining the developing roller to be in contact with the photosensitive drum;
  (b) halting rotation of the photosensitive drum and halting rotation of the developing roller for a prescribed period of time while maintaining the developing roller to be in contact with the photosensitive drum, the (b) halting being executed after the (a) rotating;
  (c) causing the photosensitive drum to start rotating and causing the developing roller to start rotating at a second speed lower than the first speed in the first direction while maintaining the developing roller to be in contact with the photosensitive drum, the (c) causing being executed after the (b) halting; and
  (d) rotating the photosensitive drum to move the residual toner collected by the collecting roller therefrom onto the photosensitive drum while separating the developing roller from the photosensitive drum, the (d) rotating being executed after the (c) causing.

15. The image-forming apparatus according to claim 14, wherein the process further comprises (e) causing the developing roller to rotate in a second direction opposite to the first direction, the (e) causing being executed after the (b) halting and prior to the (c) causing.

16. The image-forming apparatus according to claim 14, wherein the process further comprises (f) determining whether a number of continuous rotations of the photosensitive drum during the (a) rotating is equal to or greater than a prescribed number of rotations, and
 wherein the (a) rotating is ended and the (b) halting is executed when the (f) determining determines that the number of continuous rotations of the photosensitive drum is equal to or greater than the prescribed number of rotations.

17. The image-forming apparatus according to claim 14, wherein the process further comprises (g) determining whether the print job is completed, and
 wherein the (a) rotating is ended and the (b) halting is executed when the (g) determining determines that the print job is completed.

18. The image-forming apparatus according to claim 14, further comprising a blade in contact with a peripheral surface of the developing roller and configured to regulate a thickness of the toner carried on the peripheral surface of the developing roller.

19. The image-forming apparatus according to claim 18, wherein the blade comprises:
 a blade body having a plate shape; and
 a contact portion in contact with the peripheral surface of the developing roller and made of a silicone rubber.

20. The image-forming apparatus according to claim 14, wherein, in the (a) rotating, a first bias is applied to the collecting roller to move the residual toner on the photosensitive drum to the collecting roller, the first bias having a polarity opposite to a polarity of the residual toner, and
 wherein, in the (d) rotating, a second bias is applied to the collecting roller to move the residual toner on the collecting roller onto the photosensitive drum, the second bias having a polarity the same as the polarity of the residual toner.

* * * * *